US007936357B2

(12) United States Patent
Yamada

(10) Patent No.: US 7,936,357 B2
(45) Date of Patent: May 3, 2011

(54) IMAGE DISPLAY DEVICE, METHOD OF GENERATING CORRECTION VALUE OF IMAGE DISPLAY DEVICE, PROGRAM FOR GENERATING CORRECTION VALUE OF IMAGE DISPLAY DEVICE, AND RECORDING MEDIUM RECORDING PROGRAM THEREON

(75) Inventor: Yoshihito Yamada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 809 days.

(21) Appl. No.: 11/353,121

(22) Filed: Feb. 14, 2006

(65) Prior Publication Data

US 2006/0187476 A1 Aug. 24, 2006

(30) Foreign Application Priority Data

Feb. 23, 2005 (JP) ................... 2005-046588
Mar. 2, 2005 (JP) ................... 2005-057117
Nov. 15, 2005 (JP) ................... 2005-329844

(51) Int. Cl.
*G09G 5/00* (2006.01)

(52) U.S. Cl. ........................................ 345/581

(58) Field of Classification Search .......... 345/581, 345/121
See application file for complete search history.

(56) References Cited

U.S. PATENT DOCUMENTS

| 6,456,339 | B1 * | 9/2002 | Surati et al. ............... 348/745 |
| 6,817,721 | B1 * | 11/2004 | Ulichney et al. ........... 353/69 |
| 6,850,236 | B2 * | 2/2005 | Deering ...................... 345/428 |
| 2002/0003543 | A1 * | 1/2002 | Deering ...................... 345/581 |
| 2002/0015052 | A1 | 2/2002 | Deering |
| 2002/0070944 | A1 * | 6/2002 | Deering ...................... 345/581 |
| 2002/0180727 | A1 | 12/2002 | Guckenberger et al. |
| 2003/0067587 | A1 * | 4/2003 | Yamasaki et al. ........... 353/30 |
| 2004/0027361 | A1 * | 2/2004 | Chow ........................ 345/690 |
| 2004/0207618 | A1 | 10/2004 | Williams et al. |

FOREIGN PATENT DOCUMENTS

| JP | A 2000-284773 | 10/2000 |
| JP | A 2000-316170 | 11/2000 |
| JP | A-2002-162930 | 6/2002 |

* cited by examiner

*Primary Examiner* — Xiao M Wu
*Assistant Examiner* — Edward Martello
(74) *Attorney, Agent, or Firm* — Oliff & Berridge, PLC

(57) ABSTRACT

A method of generating a correction value of an image display device having an image display unit and a correction unit, the image display unit having a screen on which an image is displayed and an image generating device which is paired with the screen and of which an output characteristic value has distribution and the correction unit correcting an inputted image signal by using a correction value corresponding to the distribution of the output characteristic value and then outputting the corrected image signal to the image display unit, includes: detecting the distribution of the output characteristic value of the image displayed on the screen; setting nodes within corresponding output characteristic distribution on the basis of the detected output characteristic distribution; dividing the image into a plurality of element regions by connecting the set nodes to one another; and setting a correction value for each of the divided element regions.

10 Claims, 40 Drawing Sheets

| TRIANGLE ELEMENT NUMBER | TRIANGLE ELEMENT NODE POSITION | | | NODE VALUE OR ELEMENT VALUE (CORRECTION PARAMETER NUMBER) | | | |
|---|---|---|---|---|---|---|---|
| | ELEMENT NODE 1 | ELEMENT NODE 2 | ELEMENT NODE 3 | ELEMENT VALUE | ELEMENT NODE 1 | ELEMENT NODE 2 | ELEMENT NODE 3 |
| 1 | $(x_A, y_A)$ | $(x_B, y_B)$ | $(x_F, y_F)$ | $V_1$ | $L_1$ | $L_1$ | $L_2$ |
| 2 | $(x_B, y_B)$ | $(x_C, y_C)$ | $(x_F, y_F)$ | $V_1$ | $L_1$ | $L_1$ | $L_2$ |
| 3 | $(x_C, y_C)$ | $(x_E, y_E)$ | $(x_F, y_F)$ | $V_1$ | $L_1$ | $L_2$ | $L_2$ |
| 4 | $(x_C, y_C)$ | $(x_D, y_D)$ | $(x_E, y_E)$ | ⋅ | $L_1$ | $L_1$ | $L_2$ |
| ⋅ | ⋅ | ⋅ | ⋅ | ⋅ | ⋅ | ⋅ | ⋅ |

| TRIANGLE ELEMENT NUMBER | TRIANGLE ELEMENT NODE POSITION ||| NODE VALUE OR ELEMENT VALUE (CORRECTION PARAMETER NUMBER) ||||
| --- | --- | --- | --- | --- | --- | --- | --- |
| | ELEMENT NODE 1 | ELEMENT NODE 2 | ELEMENT NODE 3 | ELEMENT VALUE | ELEMENT NODE 1 | ELEMENT NODE 2 | ELEMENT NODE 3 |
| 1 | $(x_A, y_A)$ | $(x_B, y_B)$ | $(x_F, y_F)$ | $V_1$ | $L_A$ | $L_B$ | $L_F$ |
| 2 | $(x_B, y_B)$ | $(x_C, y_C)$ | $(x_F, y_F)$ | $V_2$ | $L_B$ | $L_C$ | $L_F$ |
| 3 | $(x_C, y_C)$ | $(x_E, y_E)$ | $(x_F, y_F)$ | $V_3$ | $L_C$ | $L_E$ | $L_F$ |
| 4 | $(x_C, y_C)$ | $(x_D, y_D)$ | $(x_E, y_E)$ | $V_4$ | $L_C$ | $L_D$ | $L_E$ |
| ... | ... | ... | ... | ... | ... | ... | ... |

| CORRECTION PARAMETER NUMBER | CORRECTION PARAMETER VALUE |
|---|---|
| $V_1$ | 1.1 |
| $V_2$ | 1.2 |
| $V_3$ | 1.4 |
| ... | ... |
| $L_A$ | 0.9 |
| $L_B$ | 1.2 |
| $L_C$ | 1.2 |
| ... | ... |

IMAGE DISPLAY DEVICE, METHOD OF GENERATING CORRECTION VALUE OF IMAGE DISPLAY DEVICE, PROGRAM FOR GENERATING CORRECTION VALUE OF IMAGE DISPLAY DEVICE, AND RECORDING MEDIUM RECORDING PROGRAM THEREON

CROSS-REFERENCE TO RELATED APPLICATIONS

The present application claims priority to Japanese Application Nos. 2005-046588 filed on Feb. 23, 2005, 2005-057117 filed on Mar. 2, 2005, and 2005-329844 filed on Nov. 15, 2005, which are hereby expressly incorporated by reference herein in their entirety.

BACKGROUND

The present invention relates to an image display device, to a method of generating a correction value of an image display device, to a program for generating a correction value of an image display device, and to a recording medium recording the program thereon.

In a fixed-pixel-type image display device, such as a projector, a liquid crystal monitor, or a plasma display, when an image is displayed by an image generating device paired with a screen on which the image is displayed, there is a case in which output characteristic values, such as a brightness output value or a color output value, in a part of the image displayed on the screen are distributed in a non-uniform manner. At this time, the non-uniform distribution is recognized as the brightness non-uniformity or color non-uniformity of the image displayed on the screen. It is considered that the brightness non-uniformity or the color non-uniformity is caused by, for example, manufacturing errors of elements forming pixels of an image generating device, such as a liquid crystal light valve.

Since the brightness non-uniformity or the color non-uniformity can be solved by correcting an electrical signal providing the distribution of an output characteristic value in a pixel unit, various correction methods have been proposed in the related art.

For example, JP-A-2000-284773 (FIG. 1, paragraphs of [0024] to [0029]) discloses a technique in which the color non-uniformity is corrected according to the gray-scale level by storing correction data corresponding to respective gray-scale levels with respect to the entire image displayed on a screen beforehand, dividing the screen in the shape of a check board, and applying the correction data for each of the divided portions of the image, in order to determine the amount to correct the color non-uniformity of the image displayed on the screen.

Furthermore, as another example, JP-A-2000-316170 (FIG. 2, paragraph of [0068]) discloses a technique in which the color non-uniformity of an image is corrected by dividing the image displayed on a screen into triangle elements, generating correction data at the apices of the triangle elements, and interpolation-generating correction data within the triangle elements by using the correction data at the apices of the triangle elements.

However, the techniques disclosed in JP-A-2000-284773 and JP-A-2000-316170 are realized by dividing a display image into uniform polygon elements and correcting the display image within each of the divided elements but have following problems.

That is, since the screen should be divided into a number of elements so as to obtain a high-quality image by improving the correction precision, the amount of correction data stored in, for example, a look-up table of an image display device becomes large. As a result, a problem arises in that a large-capacity memory is required to store such look-up table.

On the other hand, in order to make the amount of correction values as small as possible, it can be considered that an image is divided into large polygon elements and correction values corresponding to a small number of divided elements are stored in a look-up table. However, in this case, since the correction performed by using the correction values is not apt to be sufficient, it is not possible to correct the image in high precision. As a result, there is a problem in which significant improvement of the image quality can not be expected. In particular, there is a high possibility that the brightness non-uniformity, the color non-uniformity, or the like, which is locally concentrated, will not be reliably corrected.

SUMMARY

An advantage of some aspects of the invention is that it provides a method of generating a correction value of an image display device in which the image can be corrected in high precision without a large amount of correction values, a program causing a computer to execute the method, and an image display device.

According to an aspect of the invention, a method of generating a correction value of an image display device having an image display unit and a correction unit, the image display unit having a screen on which an image is displayed and an image generating device which is paired with the screen and of which an output characteristic value has distribution and the correction unit correcting an inputted image signal by using a correction value corresponding to the distribution of the output characteristic value and then outputting the corrected image signal to the image display unit, includes: detecting the distribution of the output characteristic value of the image displayed on the screen; setting nodes within corresponding output characteristic distribution on the basis of the detected output characteristic distribution; dividing the image into a plurality of element regions by connecting the set nodes to one another; and setting a correction value for each of the divided element regions.

According to the invention, since the correction value for each of the element regions is set by setting the nodes on the basis of the distribution of the detected output characteristic value of the image and then connecting the set nodes to one another so as to divide the image into the plurality of element regions, a proper correction value corresponding to the distribution of an output characteristic value can be set. As a result, it is possible to perform a correction in high precision without a large amount of correction values.

Here, the method of generating the correction value of the image display device according to the invention can be realized by using following two methods. In addition to the method of generating the correction value, the invention includes an image display device having a correction value generated by each of the two methods, a program causing a computer to execute the method of generating the correction value, and a recording medium that records the program thereon.

1. Method of Generating Correction Value by Using Equipotential Line of Distribution of Output Characteristic Value According to another aspect of the invention, an image display device includes: an image display unit having a screen on which an image is displayed and an image generating device which is paired with the screen and of which an output characteristic value has distribution; and a correction unit correcting an inputted image signal by using a correction value corresponding to the distribution of the output characteristic value and then outputting the corrected image signal to the image display unit. The correction unit includes: a correction value storage unit that sets a plurality of equipotential lines according to the distribution of the output characteristic value, divides the image displayed on the screen into a plurality of element regions on the basis of a plurality of nodes set on each of the equipotential lines, and stores a correction value for each of the divided element regions, each of the plurality of equipotential lines being obtained by joining pixels which are located within the image displayed on the screen and have approximately the same output characteristic values; and a correction processing unit that corrects the inputted image signal for each of the element regions on the basis of the correction value stored in the correction value storage unit.

According to the invention, since it is possible to correct the image displayed on the screen according to the distribution of the output characteristic value by dividing the image displayed on the screen into the plurality of element regions on the basis of the plurality of nodes set on each of the equipotential lines and then setting the correction value for each of the divided element regions, the distribution of the output characteristic value can be corrected in high precision. Accordingly, since it is possible to perform a correction in high precision with an amount of correction values smaller than that in the related art, it is possible to provide an image display device capable of displaying a high-quality image without requiring, for example, a large-capacity memory for storing a correction value.

In the invention, preferably, each of the element regions is a polygon element region formed by connecting the nodes on the equipotential lines in a straight-line manner so as not to overlap each other, and the correction value storage unit includes an element region storage table that stores node position information indicating the position of each of the element regions within the screen and a correction parameter in an element region specified by the node position information; and a correction value table that stores a correction value corresponding to the correction parameter.

According to the invention, since the information on the element regions and correction values used in an actual correction are stored in separate tables, the amount of data items corresponding to correction values can be reduced.

Further, in the invention, preferably, the correction value storage unit stores a plurality of correction values corresponding to images having different gray-scale levels.

According to the invention, by storing the plurality of correction values according to a gamma characteristic of the image display unit, a proper correction can be performed according to the gray-scale level of an image displayed by the image display unit. As a result, it is possible to provide an image display device capable of displaying an even more high-quality image.

Furthermore, in the invention, preferably, the output characteristic value is a brightness output value or a color output value of the image generating device.

According to the invention, since it is possible to correct the brightness non-uniformity and the color non-uniformity which are apt to cause troubles in the image display device, it is possible to provide an image display device capable of displaying a high-quality image by properly correcting noticeable non-uniformity of the image display device.

In the method of generating the correction value of the image display device according to the invention, a correction value to be stored in the correction unit of the image display device is generated. Specifically, the method of generating the correction value of the image display device having an image display unit and the correction unit, the image display unit having a screen on which an image is displayed and an image generating device which is paired with the screen and of which an output characteristic value has distribution and the correction unit correcting an inputted image signal by using a correction value corresponding to the distribution of the output characteristic value and then outputting the corrected image signal to the image display unit, includes: detecting the distribution of the output characteristic value of the image displayed on the screen; setting the distance between equipotential lines on the basis of the distribution of the detected output characteristic value, each of the equipotential lines being obtained by joining pixels having approximately the same output characteristic values to one another; setting a plurality of equipotential lines on the basis of the set distance between equipotential lines; setting a plurality of nodes on each of the set equipotential lines; dividing the image displayed on the screen into a plurality of element regions on the basis of the set nodes; and setting a correction value for each of the divided element regions.

According to the invention, since it is possible to generate correction values stored in the correction unit of the image display device with a minimum amount of required data items, it is not necessary to use a storage unit, such as a large-capacity memory, for the image display device. In addition, since the correction is performed on the basis of the plurality of nodes set on the equipotential lines, it is possible to correct the image displayed on the screen according to the distribution of the output characteristic value. As a result, the distribution of the output characteristic value can be corrected in high precision.

In the invention, the following methods can be considered for the setting of the distance between equipotential lines.

(1) The setting of the distance between equipotential lines includes: acquiring a portion, in which an output characteristic value farthest from an output characteristic value to be originally displayed is detected, on the basis of the distribution of the detected output characteristic value; and setting the distance between equipotential lines in the vicinity of the acquired detection portion to be narrower than those in other portions. According to the method of setting the distance between equipotential lines, in particular, since a portion having noticeable brightness non-uniformity, color non-uniformity, or the like can be carefully corrected in fine element regions, the method is effective for a case of correcting the distribution of an output characteristic value having a peak value.

(2) The setting of the distance between equipotential lines includes: generating a histogram corresponding to an output characteristic value on the basis of the distribution of the detected output characteristic value; and setting the distance between equipotential lines in the vicinity of a peak value of the generated histogram to be narrow. According to the method of setting the distance between equipotential lines, since the non-uniformity, the color non-uniformity, or the like can be carefully corrected in fine element regions and over a wide range, the method is effective for a case of correcting the distribution of an output characteristic value, such as spotted non-uniformity and color non-uniformity.

In the invention, preferably, the output characteristic value is a brightness output value or a color output value of the image generating device.

According to the invention, since it is possible to correct the brightness non-uniformity and the color non-uniformity which are apt to cause troubles in the image display device, it is possible to generate a correction value by which noticeable non-uniformity of the image display device can be properly corrected.

According to still another aspect of the invention, a program for generating a correction value of an image display device causes a computer to execute the above-described method of generating the correction value of the image display device, and a recording medium records the program for generating the correction value.

According to the invention, only by installing the program on a general-purpose computer, the above-described method of generating the correction value can be performed so as to generate a proper correction value.

2. Method of Generating Correction Value by Using Extreme Value of Distribution of Output Characteristic Value According to still another aspect of the invention, an image display device includes: an image display unit having a screen on which an image is displayed and an image generating device which is paired with the screen and of which an output characteristic value has distribution; and a correction unit correcting an inputted image signal by using a correction value corresponding to the distribution of the output characteristic value and then outputting the corrected image signal to the image display unit. The correction unit includes: a correction value storage unit that sets as nodes extreme values, which become maximum or minimum values of the output characteristic value, in the distribution of the output characteristic value within the screen, divides the image displayed on the screen into a plurality of element regions on the basis of the set nodes, and stores a correction value for each of the divided element regions; and a correction processing unit that corrects the inputted image signal for each of the element regions on the basis of the correction value stored in the correction value storage unit.

According to the invention, the image is divided into the plurality of element regions by setting as nodes the extreme values in the distribution of the output characteristic value. Accordingly, since it is possible to correct the image displayed on the screen according to the distribution of the output characteristic value, the distribution of the output characteristic value can be corrected in high precision. As a result, since it is possible to perform a correction in high precision with an amount of correction values smaller than that in the related art, it is possible to provide an image display device capable of displaying a high-quality image without requiring, for example, a large-capacity memory for storing a correction value.

In the invention, preferably, the correction value storage unit includes an element region storage table that stores node position information indicating the position of each of the element regions within the screen and a correction parameter in an element region specified by the node position information; and a correction value table that stores a correction value corresponding to the correction parameter.

According to the invention, since the information on the element regions and correction values used in an actual correction are stored in separate tables, the amount of data items corresponding to correction values can be reduced.

Further, in the invention, preferably, the correction value storage unit stores a plurality of correction values corresponding to images having different gray-scale levels.

According to the invention, by storing the plurality of correction values according to a gamma characteristic of the image display unit, a proper correction can be performed according to the gray-scale level of an image displayed by the image display unit. As a result, it is possible to provide an image display device capable of displaying an even more high-quality image.

Furthermore, in the invention, preferably, the output characteristic value is a brightness output value or a color output value of the image generating device.

According to the invention, since it is possible to correct the brightness non-uniformity and the color non-uniformity which are apt to cause troubles in the image display device, it is possible to provide an image display device capable of displaying a high-quality image by properly correcting noticeable non-uniformity of the image display device.

In the method of generating the correction value of the image display device according to the invention, a correction value to be stored in the correction unit of the image display device is generated. Specifically, the method of generating the correction value of the image display device having an image display unit and the correction unit, the image display unit having a screen on which an image is displayed and an image generating device which is paired with the screen and of which an output characteristic value has distribution and the correction unit correcting an inputted image signal by using a correction value corresponding to the distribution of the output characteristic value and then outputting the corrected image signal to the image display unit, includes: detecting the distribution of the output characteristic value of the image displayed on the screen; setting extreme values, which become maximum or minimum values of the output characteristic value, on the basis of the distribution of the detected output characteristic value; dividing the image displayed on the screen into a plurality of element regions by using the set extreme values as nodes; and setting a correction value for each of the divided element regions.

Here, the correction value generated by the invention can be preferably used to correct an image of a fixed-pixel-type image display device. For example, the correction value can be used in a projector that modulates light beams emitted from a light source, besides an organic EL display, a liquid crystal display, or a plasma display, according to image information so as to form an optical image and then enlarges the optical image so as to project the optical image.

In addition, in the setting of the extreme values, when an image signal, by which all pixels are displayed with the same brightness values, is input, the position of a pixel having highest brightness compared with the vicinity thereof or the position of a pixel having lowest brightness compared with the vicinity thereof is set as an extreme value.

In addition, as a method of dividing an image into a plurality of element regions, for example, a Delaunay triangle division method used for modeling of space data may be used.

According to the invention, since it is possible to generate correction values stored in the correction unit of the image display device with a minimum amount of required data items, it is not necessary to use a storage unit, such as a large-capacity memory, for the image display device. In addition, since the correction is performed on the basis of nodes set as extreme values of the output characteristic value, it is possible to correct the image displayed on the screen according to the distribution of the output characteristic value. As a result, the distribution of the output characteristic value can be corrected in high precision.

Further, in the invention, it is preferable to further include: acquiring distribution of an output characteristic of an image corrected by the generated correction value after the setting of the correction value has been performed; and evaluating the corrected image by determining whether or not the corrected image is qualified on the basis of the distribution of the output characteristic after being corrected and then reperforming the setting of the extreme value or the setting of the corrected value if it is determined that the corrected image is not qualified.

According to the invention, even though an amount of data items increases as compared with a case in which a process of generating a correction value is performed only once, an even more precise correction value is set. As a result, since the quality of an image can be highly improved, it is possible to obtain a correction value by which an extremely high-quality image can be displayed in proportion to the increased amount of data items, as compared with the related art.

Furthermore, in the invention, preferably, in the reperforming of the setting of the extreme value, new extreme values are added in addition to the extreme values set in the previous setting of the extreme value.

According to the invention, since the new extreme values are added in addition to the extreme values set in the first setting of the extreme value so as to set division elements, the precision of newly generated correction data is reliably improved as compared with that of the previous correction data.

In addition, in the invention, preferably, the output characteristic value is a brightness output value or a color output value of the image generating device.

According to the invention, since it is possible to correct the brightness non-uniformity and the color non-uniformity which are apt to cause troubles in the image display device, it is possible to generate a correction value by which noticeable non-uniformity of the image display device can be properly corrected.

According to still another aspect of the invention, a program for generating a correction value of an image display device causes a computer to execute the above-described method of generating the correction value of the image display device, and a recording medium records the program for generating the correction value.

According to the invention, only by installing the program in a general-purpose computer, the above-described method of generating the correction value can be performed so as to generate a proper correction value.

BRIEF DESCRIPTION OF THE DRAWINGS

The invention will be described with reference to the accompanying drawings, wherein like numbers reference like elements.

FIG. 18 is a view schematically illustrating the data structure of the generated correction value in the embodiment.

FIG. 32 is a view schematically illustrating the data structure of the generated correction value in the embodiment.

FIG. 33 is a view schematically illustrating the data structure of the generated correction value in the embodiment.

DETAILED DESCRIPTION OF EXEMPLARY EMBODIMENTS

Hereinafter, embodiments of the invention will be described with reference to the drawings.

First Embodiment

1. Configuration of Correction Data Generating Device 1

(1) Configuration of Overall Device

Figure 1:
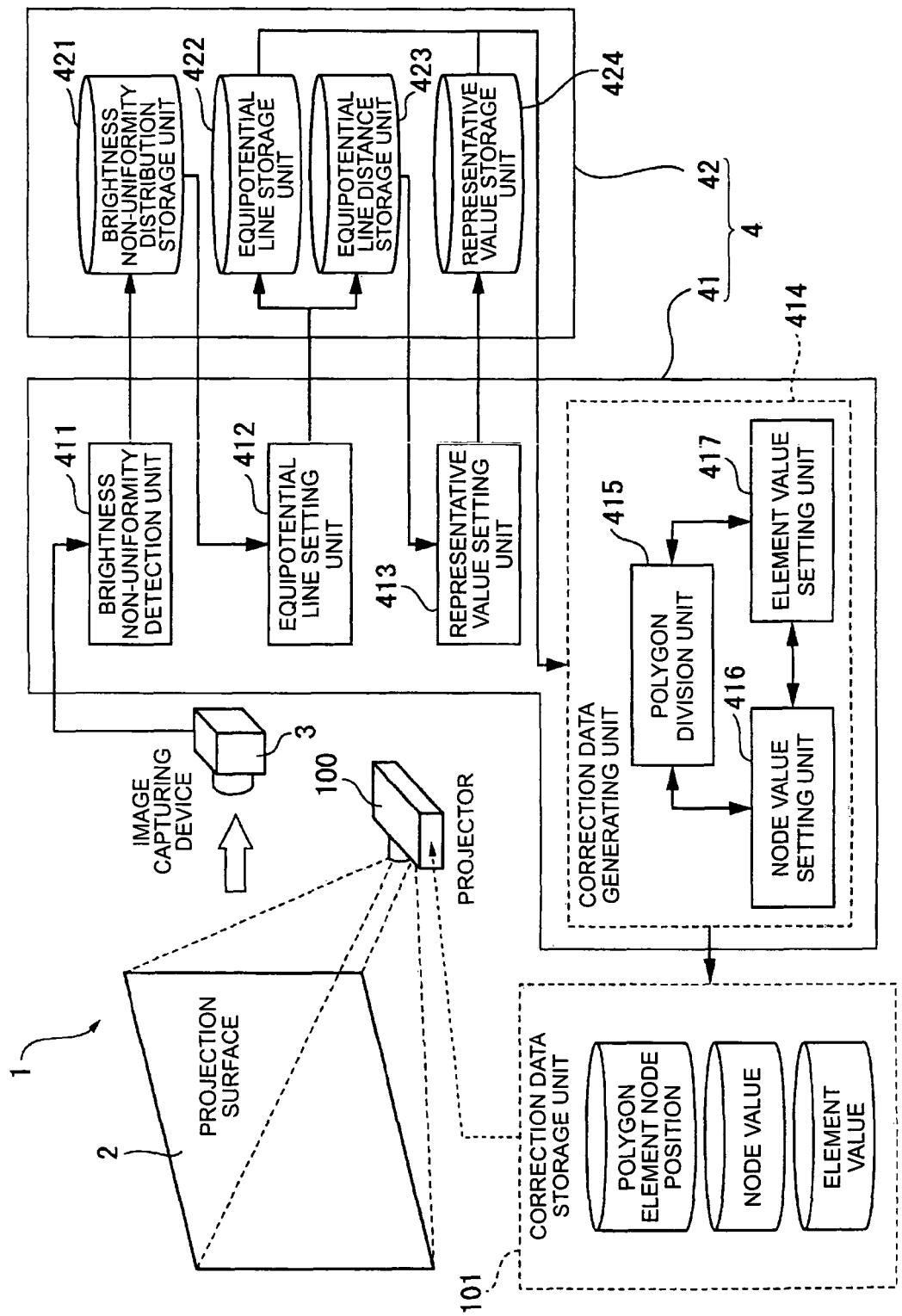
FIG. 1 is a view schematically illustrating the configuration of a correction data generating device according to an embodiment of the invention.

FIG. 1 is a view schematically illustrating a correction data generating device 1 of a projector according to a first embodiment of the invention. The correction data generating device 1 includes a screen 2, a CCD camera 3, and a computer 4, and generates correction data for correcting the brightness non-uniformity of a projection image, for which the correction data is generated, projected from a projector 100, the brightness non-uniformity being caused by distribution of an output characteristic value.

On the screen 2, the projection image for which the correction data is generated is projected from the projector 100. The CCD camera 3 serves as an image capturing device that captures a projection image projected on the screen 2, and the image captured by the CCD camera 3 is converted into an electrical signal to be output to the computer 4.

The computer 4 reads the image captured by the CCD camera 3 and then performs an image processing so as to generate correction data of the projector 100.

The correction data generated by the computer 4 is stored in a correction data storage unit 101, such as a memory, provided in the projector 100. As will be described in detail later, when the projector 100 projects an image, an image signal is corrected by using the correction data stored in the correction data storage unit 101 and then the image is projected.

The computer 4 includes a CPU 41 and a storage device 42, and an electrical signal according to an image captured by the CCD camera 3 is converted into digital image data to be processed by the CPU 41.

The CPU 41 includes a brightness non-uniformity detection unit 411, an equipotential line setting unit 412, a representative value setting unit 413, and a correction data generating unit 414. In the storage device 42, a brightness non-uniformity distribution storage unit 421, an equipotential line storage unit 422, an equipotential line distance storage unit 423, and a representative value storage unit 424 are provided in a part of a storage area so as to store a detected value, a set value, or the like.

(2) Configuration of Functional Units in CPU 41

(2-1) Configuration of Brightness Non-Uniformity Detection Unit 411

Figure 2:
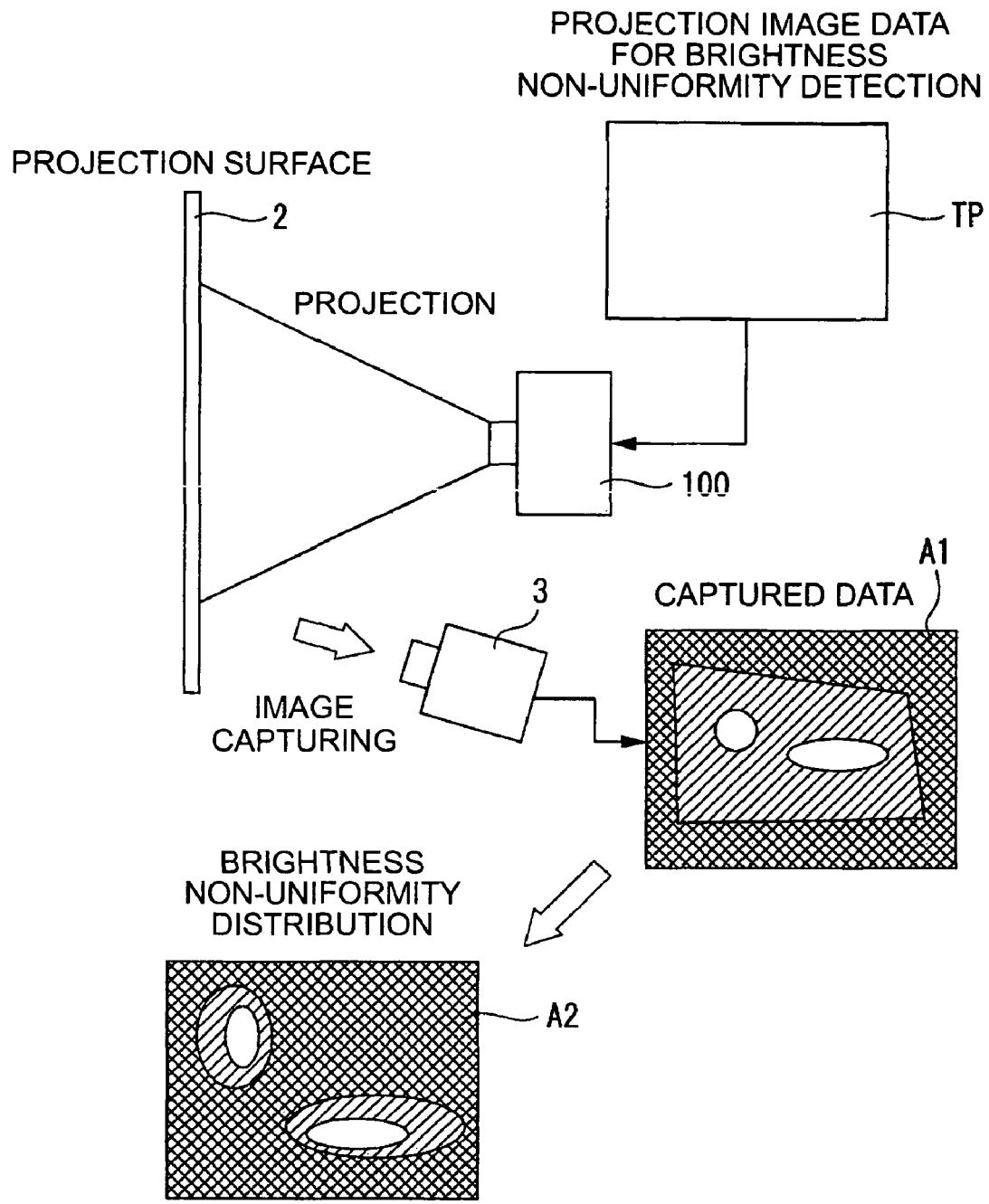
FIG. 2 is a view schematically illustrating the brightness non-uniformity detection performed by a brightness non-uniformity detection unit in the embodiment.
Figure 3:
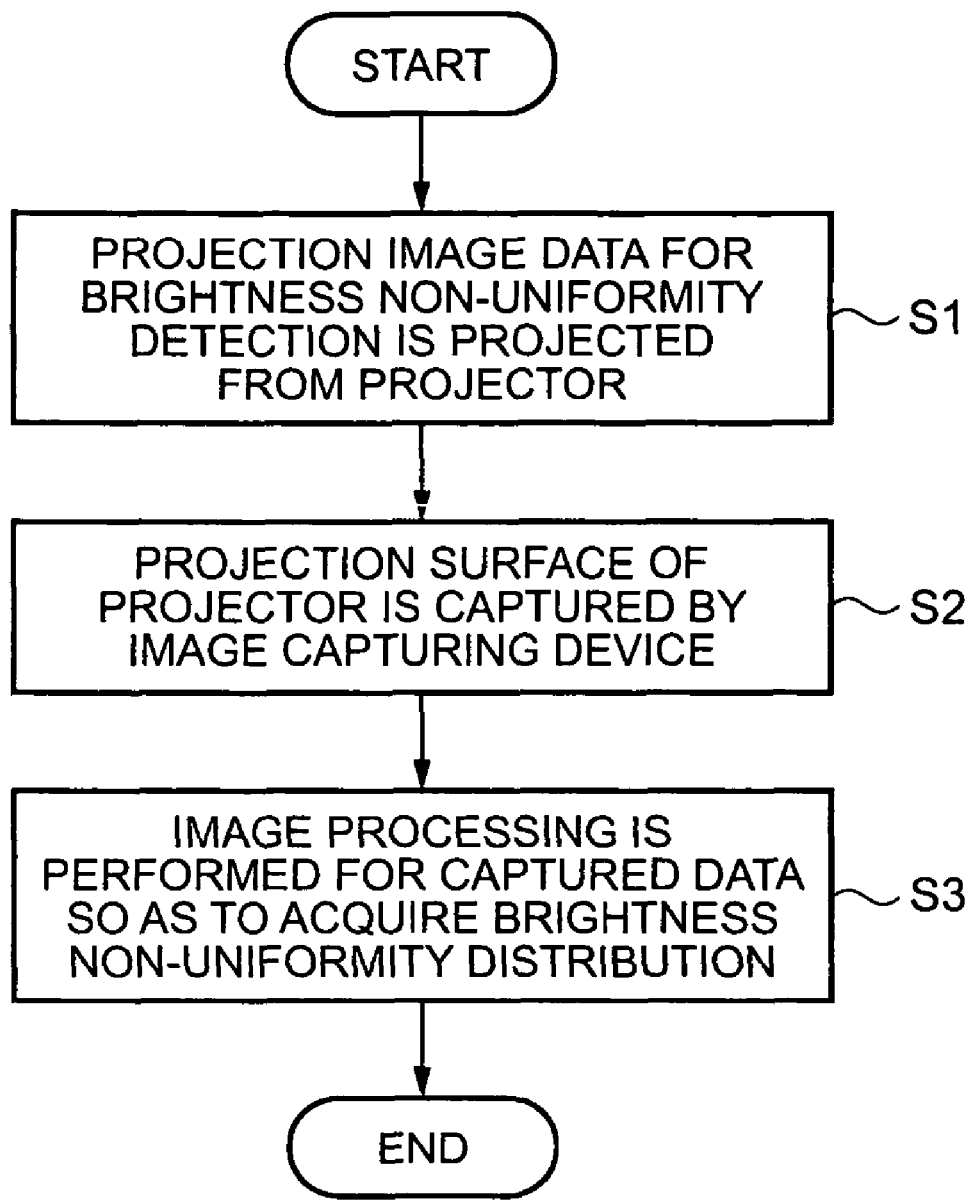
FIG. 3 is a flowchart illustrating an operation of the brightness non-uniformity detection unit in the embodiment.

The brightness non-uniformity detection unit 411 detects the brightness non-uniformity on the basis of an output from the CCD camera 3 which captures a projection image projected from the projector 100, and specifically, the brightness non-uniformity detection unit 411 performs processes shown in FIGS. 2 and 3.

First, the brightness non-uniformity detection unit 411 inputs projection image data TP for brightness non-uniformity detection to the projector 100, which is an object to be corrected, and the projector 100 projects an projection image according to the image data onto a projection surface of the screen 2 (process S1). At this time, the projection image data TP for brightness non-uniformity detection displays a single-color image having a predetermined gray-scale level.

Then, the brightness non-uniformity detection unit 411 captures the projection image projected onto the projection surface by using the CCD camera 3 serving as an image capturing device, and then loads captured data A1 as digital data (process S2).

Finally, the captured data A1 is subjected to an image processing, in which the brightness non-uniformity is precisely reflected, so as to acquire brightness non-uniformity distribution A2 which becomes the distribution of an output characteristic value, and the data having been subjected to the image processing is stored in the brightness non-uniformity distribution storage unit 421 (process S3: distribution detection process).

(2-2) Configuration of Equipotential Line Setting Unit 412

Figure 4:
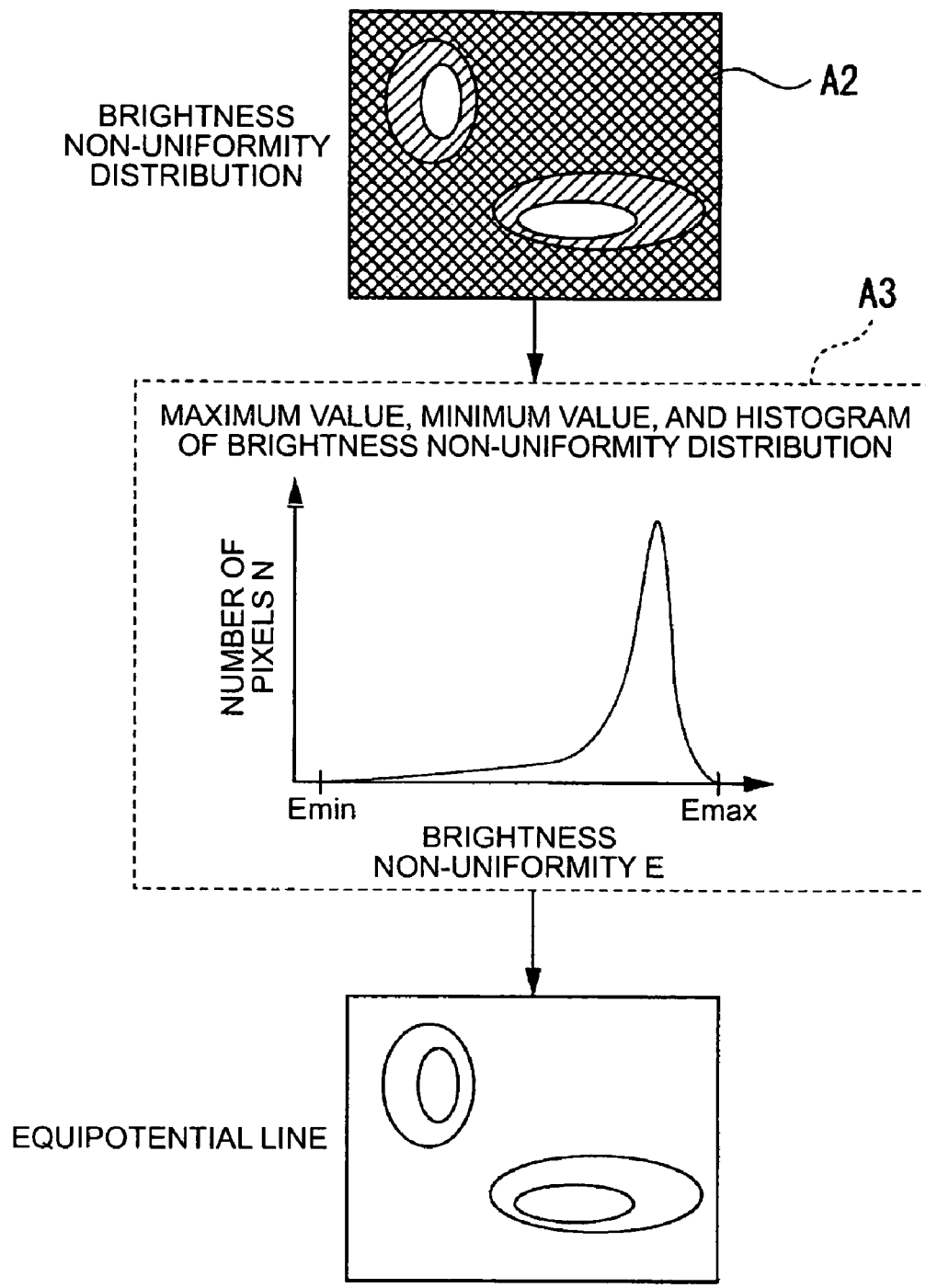
FIG. 4 is a schematic view for explaining a process of setting the distance between equipotential lines in the embodiment.
Figure 5:
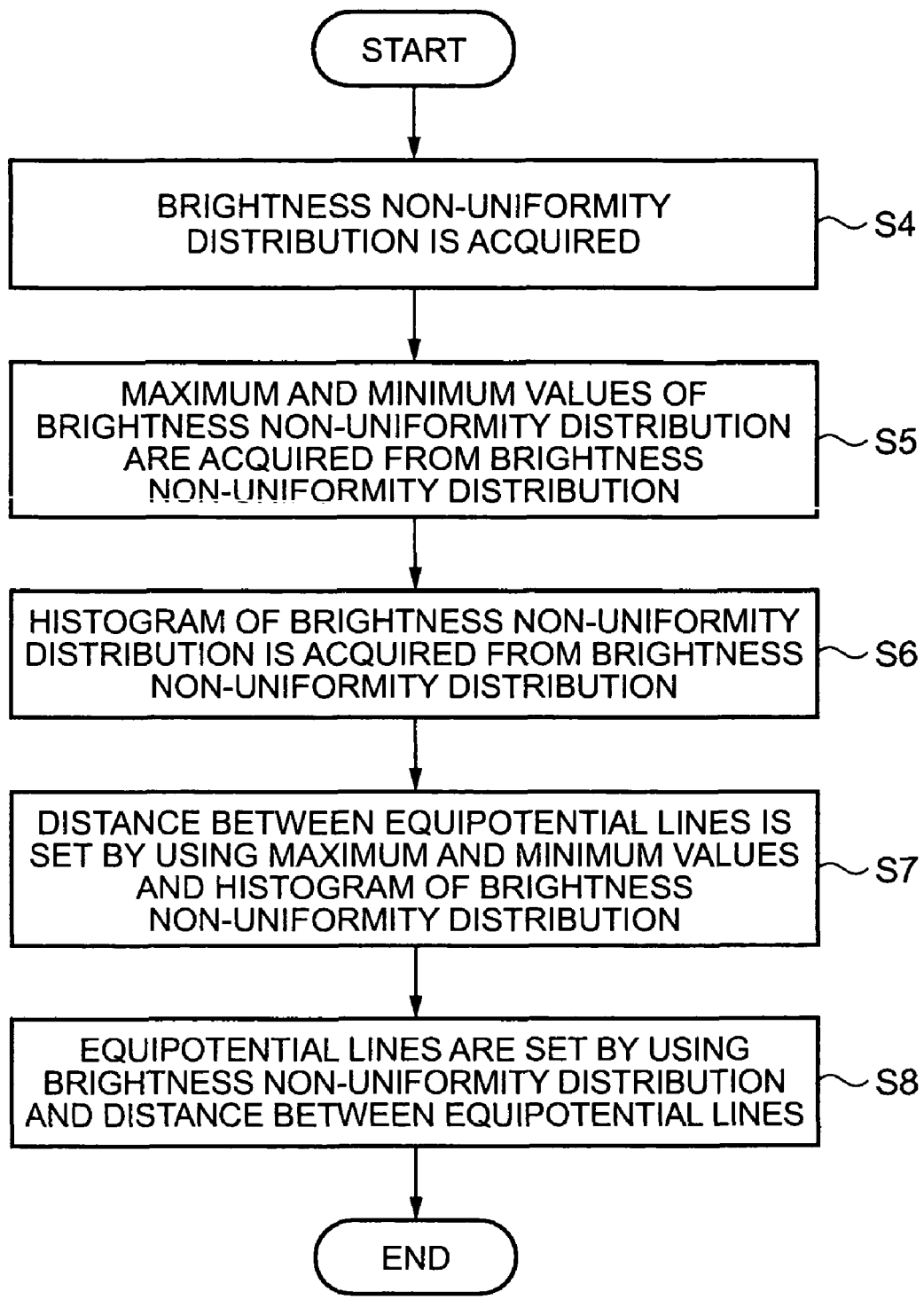
FIG. 5 is a flowchart illustrating a method of setting the distance between equipotential lines in the embodiment.

The equipotential line setting unit 412 sets the distance, at which the brightness non-uniformity becomes equal, between equipotential lines on the basis of the acquired brightness non-uniformity distribution A2, and then sets the equipotential lines on the brightness non-uniformity distribution A2 on the basis of the set distance between the equipotential lines. Specifically, the equipotential line setting unit 412 performs processes shown in FIGS. 4 and 5.

First, the equipotential line setting unit 412 acquires the brightness non-uniformity distribution A2 stored in the brightness non-uniformity distribution storage unit 421 (process S4).

Then, the equipotential line setting unit 412 acquires the maximum and minimum values of the brightness non-uniformity by using the acquired brightness non-uniformity distribution A2 (process S5).

Thereafter, the equipotential line setting unit 412 acquires a histogram A3 with respect to the brightness non-uniformity by using the brightness non-uniformity distribution A2 (process S6).

The equipotential line setting unit 412 sets the distance between equipotential lines on the basis of the histogram A3 (process S7: process of setting the distance between equipotential lines).

Figure 6:
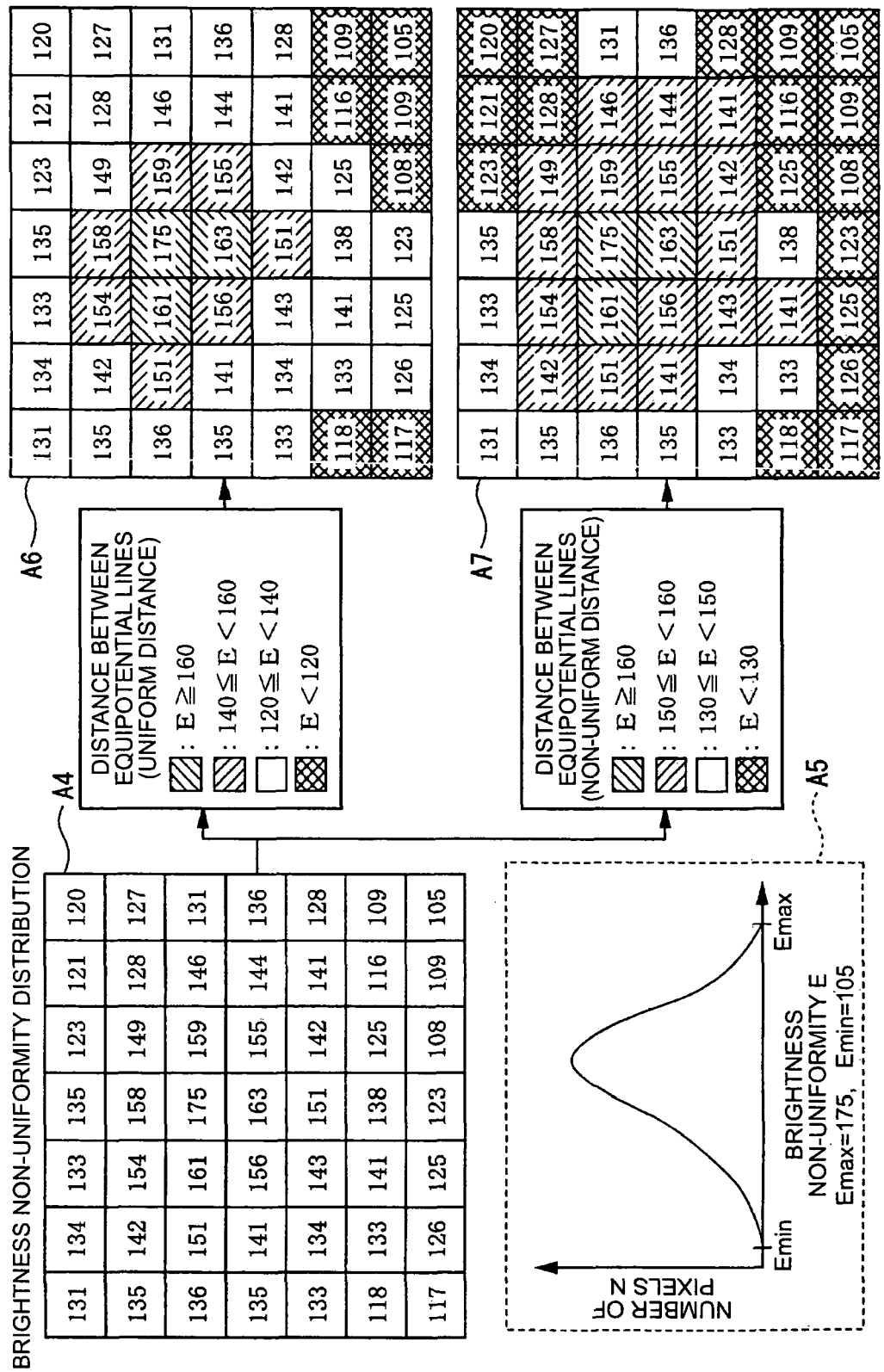
FIG. 6 is a schematic view for explaining a process of setting the distance between equipotential lines in the embodiment.

For example, when a brightness non-uniformity distribution image A4 shown in FIG. 6 is acquired and the brightness non-uniformity distribution is in a state shown in a histogram A5, assuming that the distance between equipotential lines is uniform as $E \geq 160$, $140 \leq E < 160$, $120 \leq E < 140$, $E < 120$, the brightness non-uniformity distribution image A4 is classified like an image A6. On the other hand, when the distance between equipotential lines is not uniform as $E \geq 160$, $150 \leq E < 160$, $130 \leq E < 150$, $E < 130$, the brightness non-uniformity distribution image A4 is classified like an image A7. That is, the equipotential line setting unit 412 can arbitrarily set the distance between equipotential lines according to which correction process will be performed.

Figure 7:
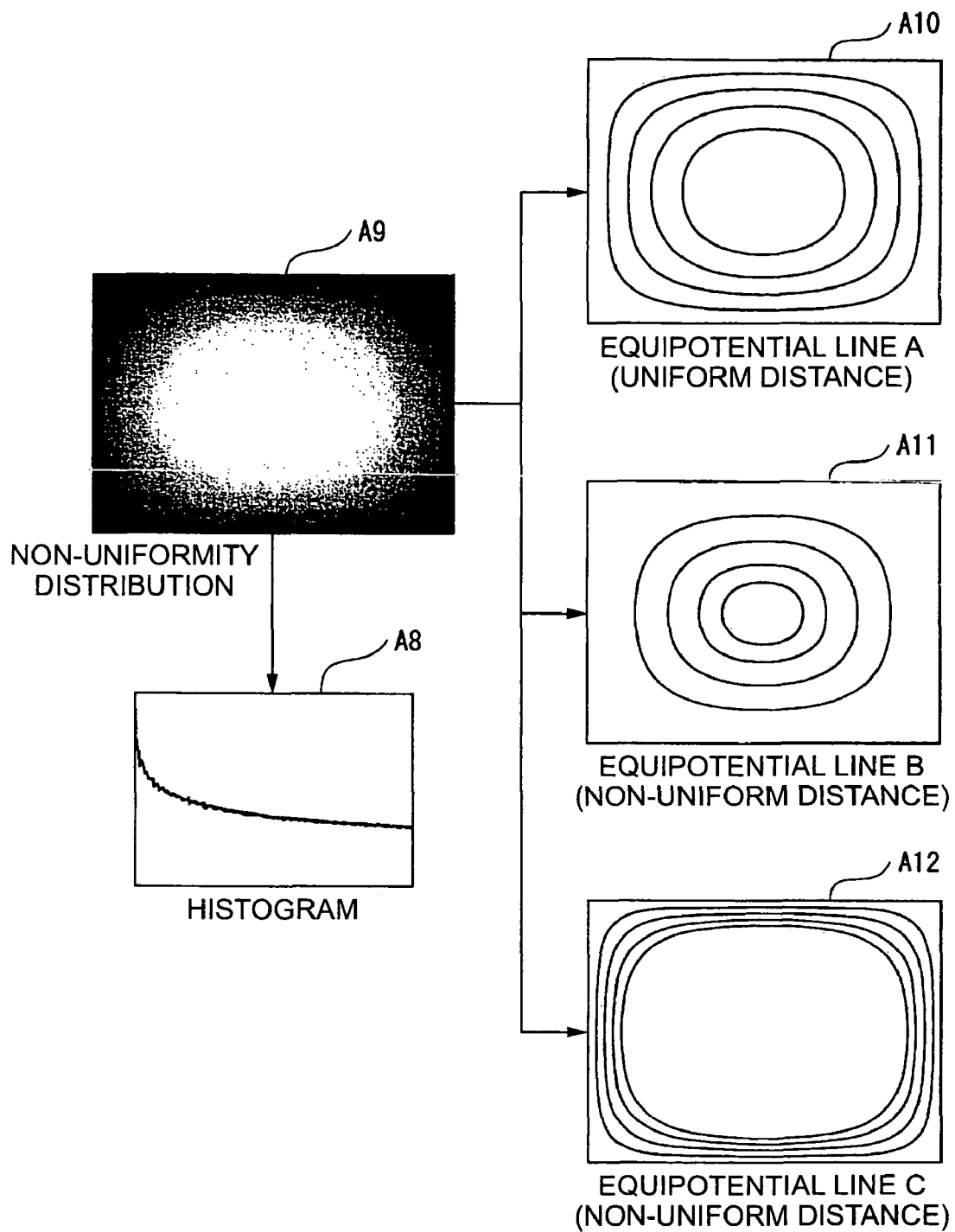
FIG. 7 is a schematic view for explaining a process of setting the distance between equipotential lines in the embodiment.

Specifically, for example, as shown in FIG. 7, when a brightness non-uniformity distribution image A9 having brightness non-uniformity distribution such as a histogram A8 is acquired, the equipotential line setting unit 412 can be free to set equipotential lines, such as an equipotential line A in an image A10 set in a uniform distance, an equipotential line B in an image A11 set in a non-uniform distance, and an equipotential line C in an image A12 set in a non-uniform distance, according to the characteristics of the correction data.

The equipotential line A is used in the simplest method of setting the distance between equipotential lines, which is set to be uniform. The equipotential line A is advantageous in that it is not necessary to perform a special process in the distance setting process.

The equipotential line B is used in a method of setting the distance between equipotential lines such that the distance becomes narrow around the maximum value of the brightness non-uniformity distribution. The distance between equipotential lines becomes narrow at approximately a center portion of the brightness non-uniformity distribution image A9. According to the setting method, in particular, it becomes possible to set correction data for carefully correcting noticeable non-uniformity, which is effective for correcting non-uniformity having, for example, a peak.

The equipotential line C is used in a method of setting the distance between equipotential lines such that the distance becomes narrow around the peak value of the histogram A8 with respect to the brightness non-uniformity distribution image A9. According to the setting method, it becomes possible to set correction data for carefully correcting a region in which, for example, the brightness non-uniformity becomes large over the wide range, which is effective for correcting spotted non-uniformity.

Figure 8:
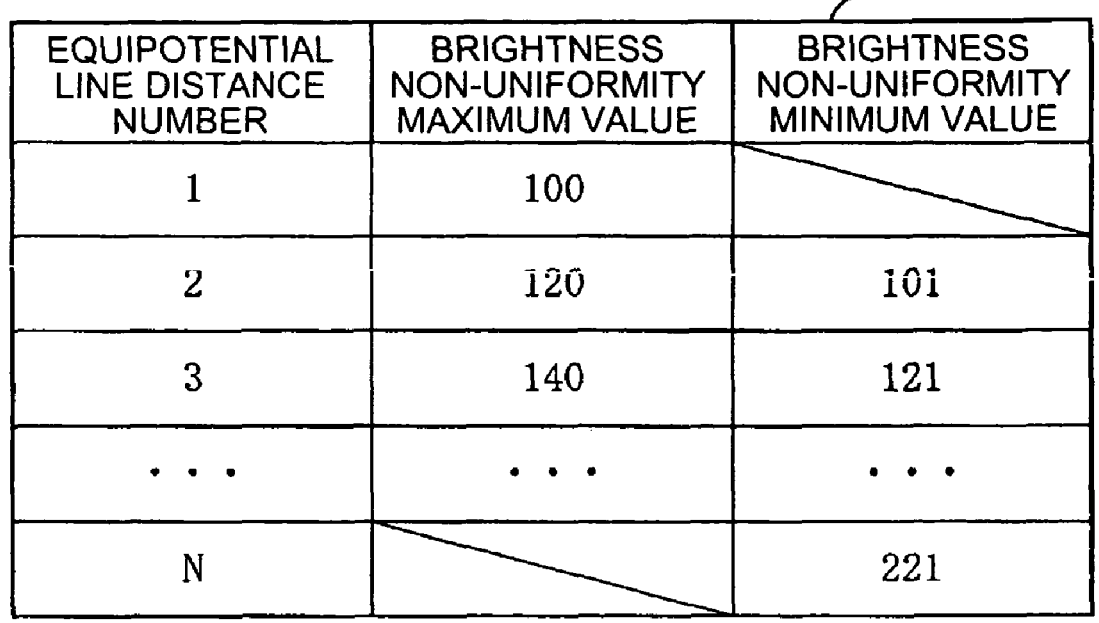
FIG. 8 is a view schematically illustrating the data structure of an equipotential line distance storage unit storing the distance between equipotential lines set in the embodiment.

As shown in FIG. 8, the respective distances between equipotential lines set as described above are stored in the equipotential line distance storage unit 423 as a table T1 including an equipotential line distance number, a brightness non-uniformity minimum value, and a brightness non-uniformity maximum value as one record.

Referring back to FIG. 5, when the process of setting the distance between equipotential lines is completed, the equipotential line setting unit 412 sets equipotential lines on the basis of the brightness non-uniformity distribution A2 and the set distance between equipotential lines (process S8: process of setting an equipotential line).

Figure 9:
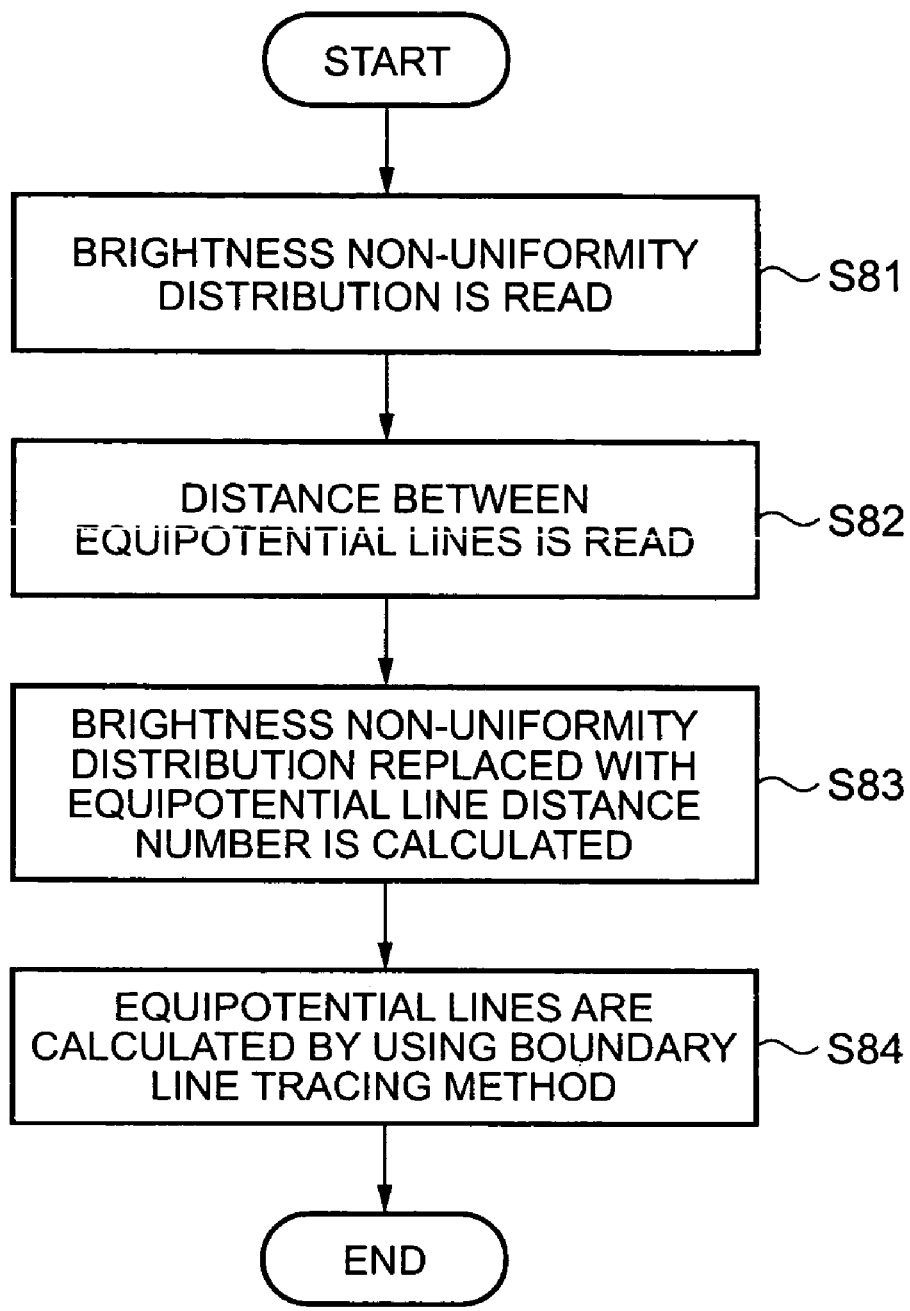
FIG. 9 is a flowchart illustrating the procedure of setting the equipotential lines in the embodiment.
Figure 10:
FIG. 10 is a view schematically illustrating the data structure of an equipotential line storage unit storing the equipotential lines set in the embodiment.

The process of setting the equipotential lines is performed by procedure shown in a flowchart of FIG. 9.

First, the equipotential line setting unit 412 reads the brightness non-uniformity distribution A2 (process S81), and then reads the distance between equipotential lines (process S82).

Subsequently, the equipotential line setting unit 412 calculates brightness non-uniformity distribution replaced with the equipotential line distance number (process S83). That is, the brightness non-uniformity distribution image A4 shown in FIG. 6 is replaced with an image, such as the image A6 or the image A7.

Finally, the equipotential line setting unit 412 calculates the equipotential lines by using a boundary line tracing method (process S84). A four-connection boundary line tracing method or an eight-connection boundary line tracing method may be used as the boundary line tracing method.

All of the calculated equipotential lines are stored in the equipotential line storage unit 422 as a table T2 including an equipotential line number, a brightness non-uniformity value, the number of boundary points, and information on positions of the boundary points as one record.

(2-3) Configuration of Representative Value Setting Unit 413

Figure 11:
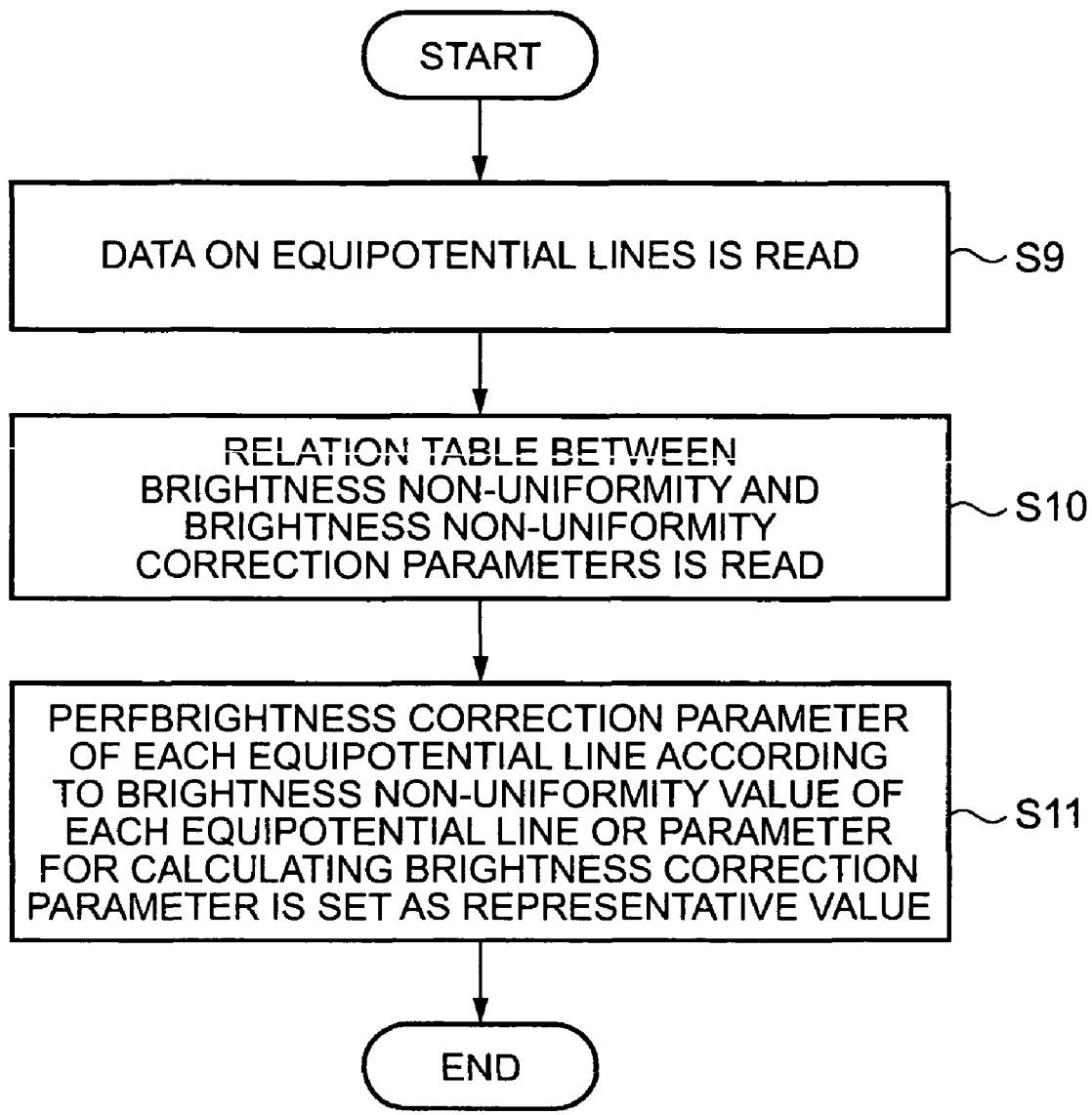
FIG. 11 is a flowchart for explaining a method of setting a representative value on the basis of the equipotential lines set in the embodiment.
Figure 12:
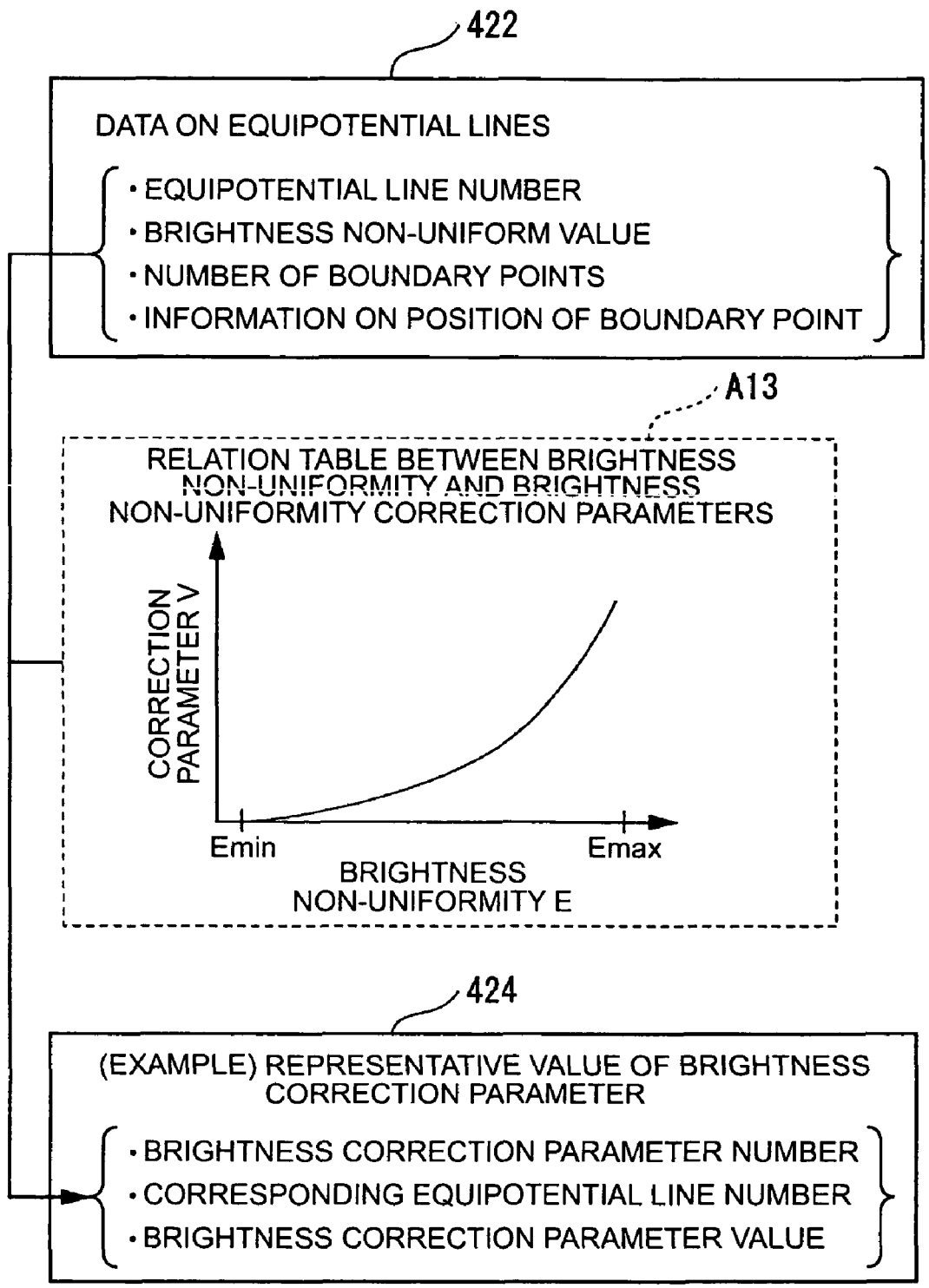
FIG. 12 is a schematic view for explaining a method of setting a representative value in the embodiment.

The representative value setting unit 413 sets the representative value of a brightness correction parameter for correcting the brightness non-uniformity on the basis of data on the equipotential lines set by the equipotential line setting unit 412. Specifically, the representative value setting unit 413 performs processes shown in FIGS. 11 and 12.

First, the representative value setting unit 413 reads the data on equipotential lines from the equipotential line storage unit 422 (process S9). The data on equipotential lines includes an equipotential line number, a brightness non-uniformity value, the number of boundary points, and information on the positions of the boundary points, for example.

Thereafter, the representative value setting unit 413 reads a relation table between brightness non-uniformity and brightness non-uniformity correction parameters in which the brightness non-uniformity prepared beforehand corresponds to the brightness non-uniformity correction (process S10. In the relation table between brightness non-uniformity and brightness non-uniformity correction parameters, like a graph A13 shown in FIG. 12, a brightness non-uniformity E corresponds to a correction parameter V, and as the brightness non-uniformity E is larger, the correction amount due to the correction parameter V is larger.

Finally, the representative value setting unit 413 sets, as a representative value, a brightness correction parameter of each equipotential line according to the brightness non-uniformity value of each equipotential line or a parameter for calculating a brightness correction parameter on the basis of the relation table between the data on equipotential lines and brightness non-uniformity correction parameters (process S11). The representative value includes, for example, a brightness correction parameter number, a corresponding equipotential line number, and a brightness correction parameter value, and the set representative value is stored in the representative value storage unit 424.

(2-4) Configuration of Correction Data Generating Unit 414

Figure 13:
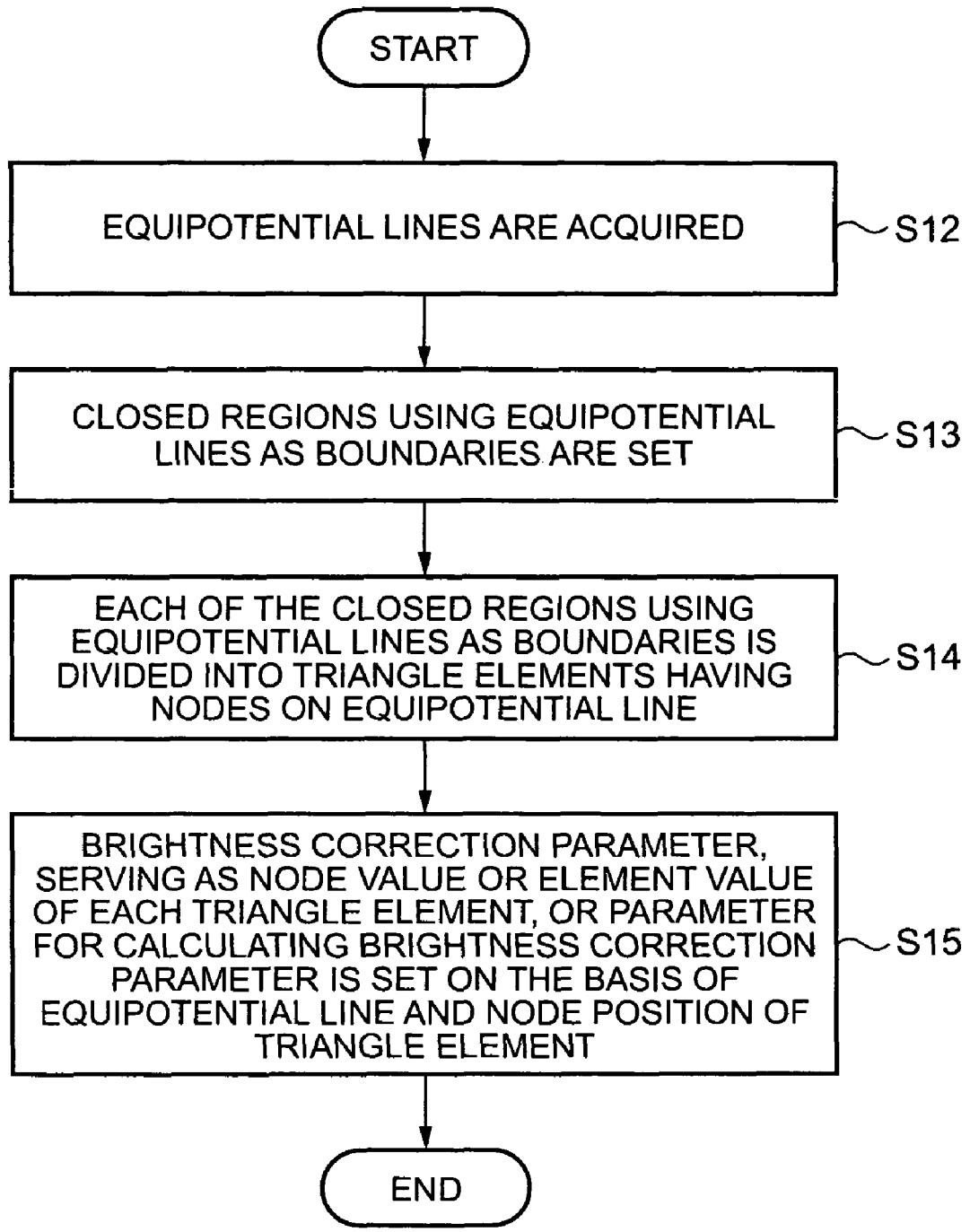
FIG. 13 is a flowchart illustrating the procedure of dividing a polygon element region and setting a correction value by a polygon division unit in the embodiment.

The correction data generating unit 414 generates correction data, which becomes a correction value, on the basis of the equipotential lines set by the equipotential line setting unit 412, and includes a polygon division unit 415, a node value setting unit 416, and an element value setting unit 417. Specifically, these units perform processes shown in FIGS. 13 and 14.

Figure 14:
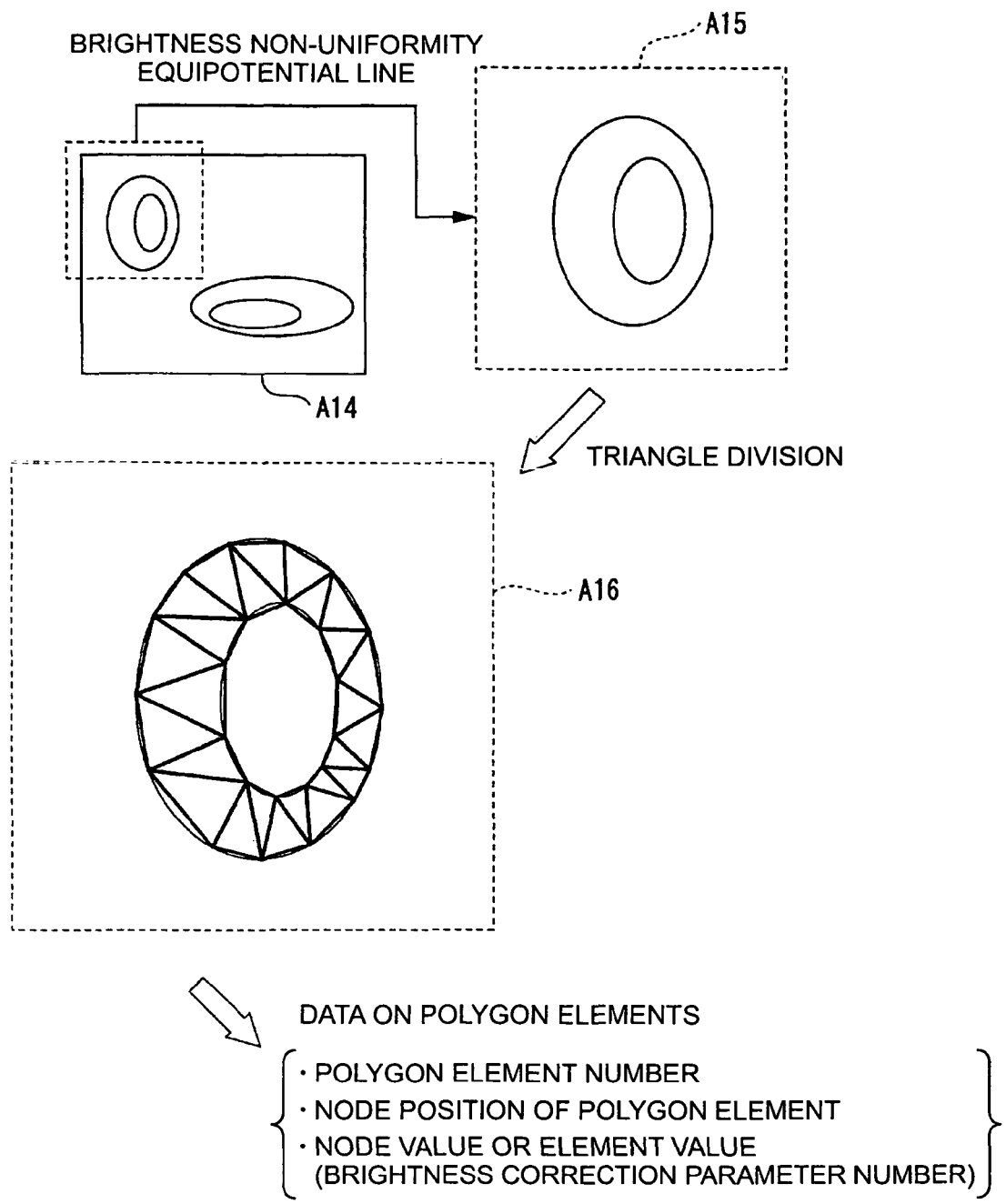
FIG. 14 is a schematic view for explaining a method of dividing a polygon element region and setting a correction value by using the polygon division unit in the embodiment.

First, the polygon division unit 415 acquires an equipotential line, such as an equipotential line in an area A14 shown in FIG. 14, from the equipotential line storage unit 422 (process S12).

When the process of acquiring equipotential lines is completed, the polygon division unit 415 sets closed regions due to the equipotential lines shown in an area A15 is set (process S13).

When the process of setting the closed regions is completed, each of the closed regions is divided into a plurality of polygon element regions (process S14: process of setting a division element).

Finally, the node value setting unit 416 and the element value setting unit 417 sets an element value, which becomes the brightness correction parameter, or a node value, which becomes a parameter for calculating the brightness correction parameter, according to each of the polygon element regions (process S15: process of setting a correction value).

Figure 15:
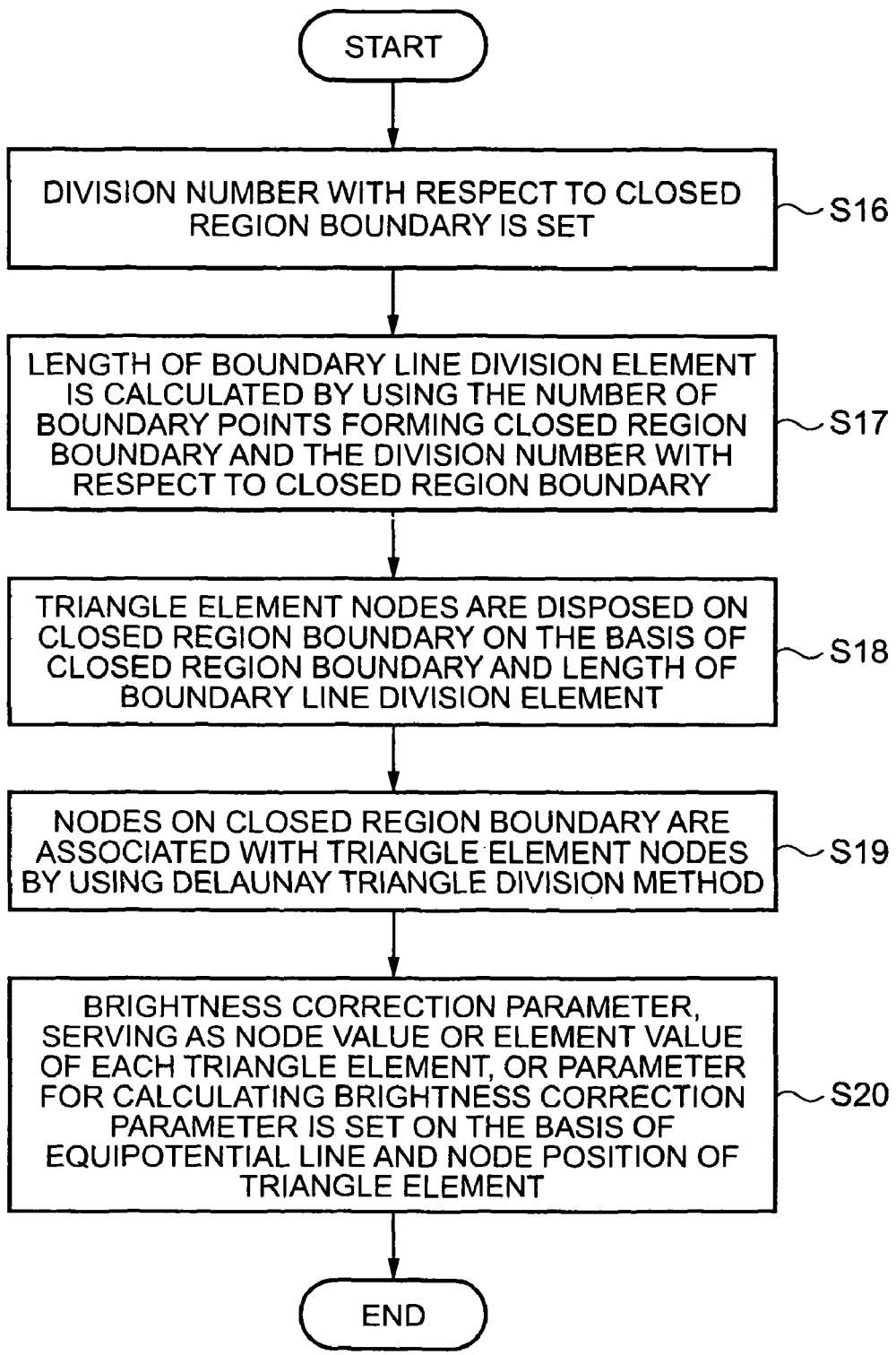
FIG. 15 is a flowchart illustrating the procedure of dividing a polygon element region by using the polygon division unit in the embodiment.
Figure 16:
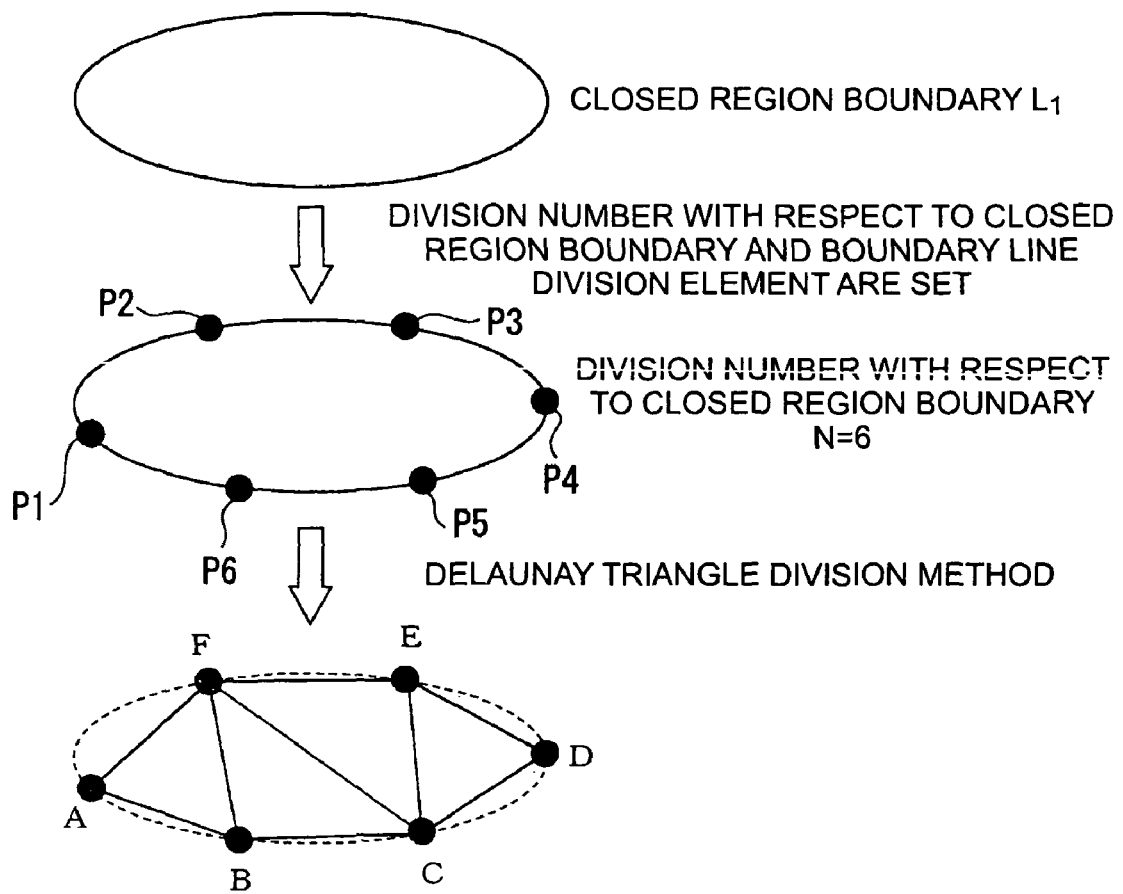
FIG. 16 is a schematic view for explaining a method of dividing a polygon element region by using the polygon division unit in the embodiment.

Specifically, the polygon division unit 415, the node value setting unit 416, and element value setting unit 417 perform the setting processes in the order shown in FIGS. 15 and 16. First, as shown in FIG. 16, the polygon division unit 415 sets the division number with respect to a closed region boundary on the basis of a closed region boundary L1 formed by equipotential lines (process S16: process of setting a node). In addition, in FIG. 16, assuming that the division number N with respect to a closed region boundary is six, six nodes P1 to P6 are set on the boundary line.

Then, the polygon division unit 415 calculates the length of a boundary line division element by using the number of boundary points forming the closed region boundary L1 and the division number with respect to the closed region boundary (process S17).

Subsequently, on the basis of the closed region boundary L1 and the length of the boundary line division element, nodes are disposed on the closed region boundary (process S18).

Then, the polygon division unit 415 associates the nodes P1 to P6, which are located on the closed region boundary, with triangle element nodes A to F by using a Delaunay triangle division method (process S19).

Finally, the node value setting unit 416 sets, as a node value of each triangle element region, a parameter for calculating a brightness correction parameter on the basis of the node positions of the equipotential line and the triangle element region, and the element value setting unit 417 sets a brightness correction parameter as an element value according to the equipotential line and the triangle element region (process S20: process of setting a correction value).

Finally, the correction data generating unit 414 stores the triangle element region, the node value, and the element value, which have been set by the polygon division unit 415, the node value setting unit 416, and the element value setting unit 417, as data included in a table which is set for each triangle element region.

Figure 17:
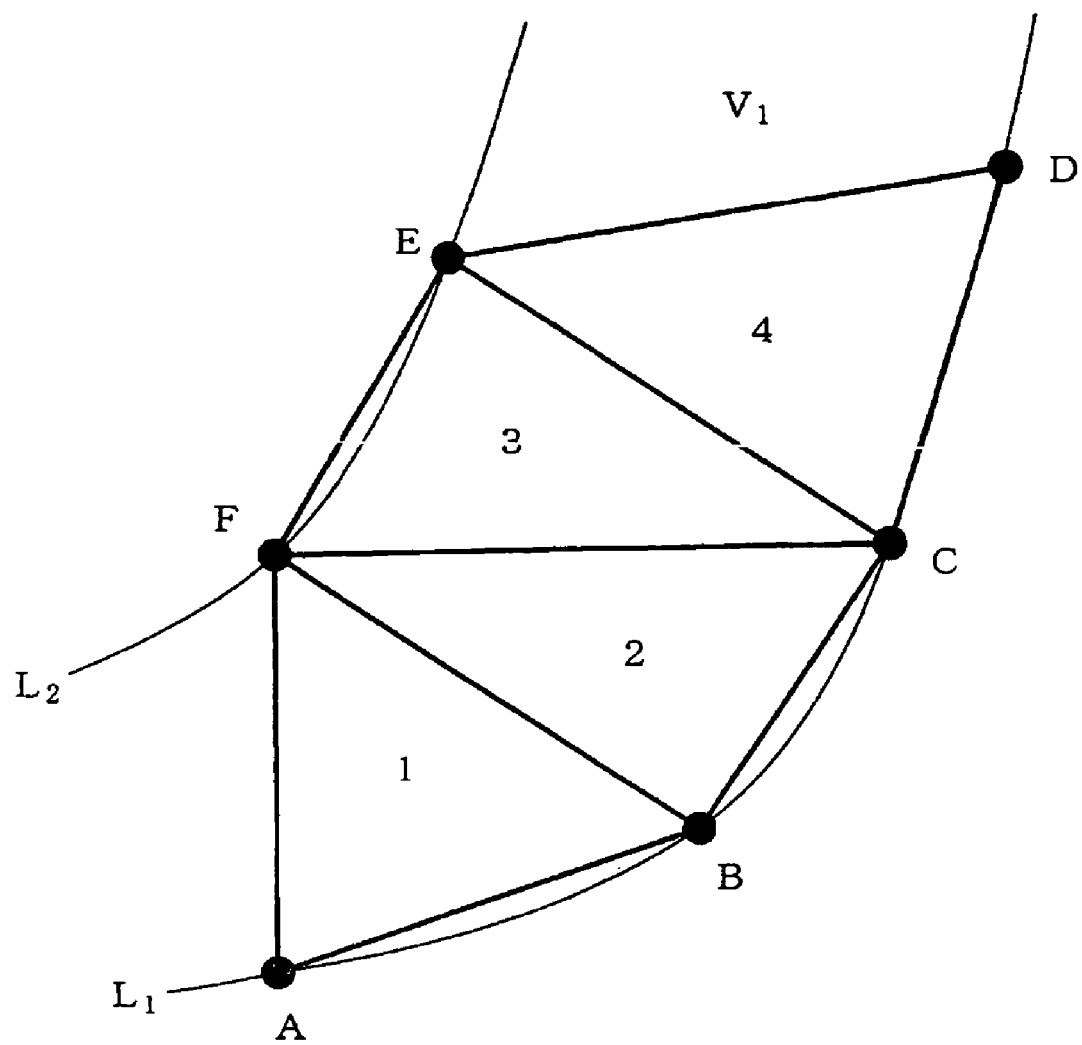
FIG. 17 is a schematic view for explaining a generated correction value in the embodiment.
Figure 19:
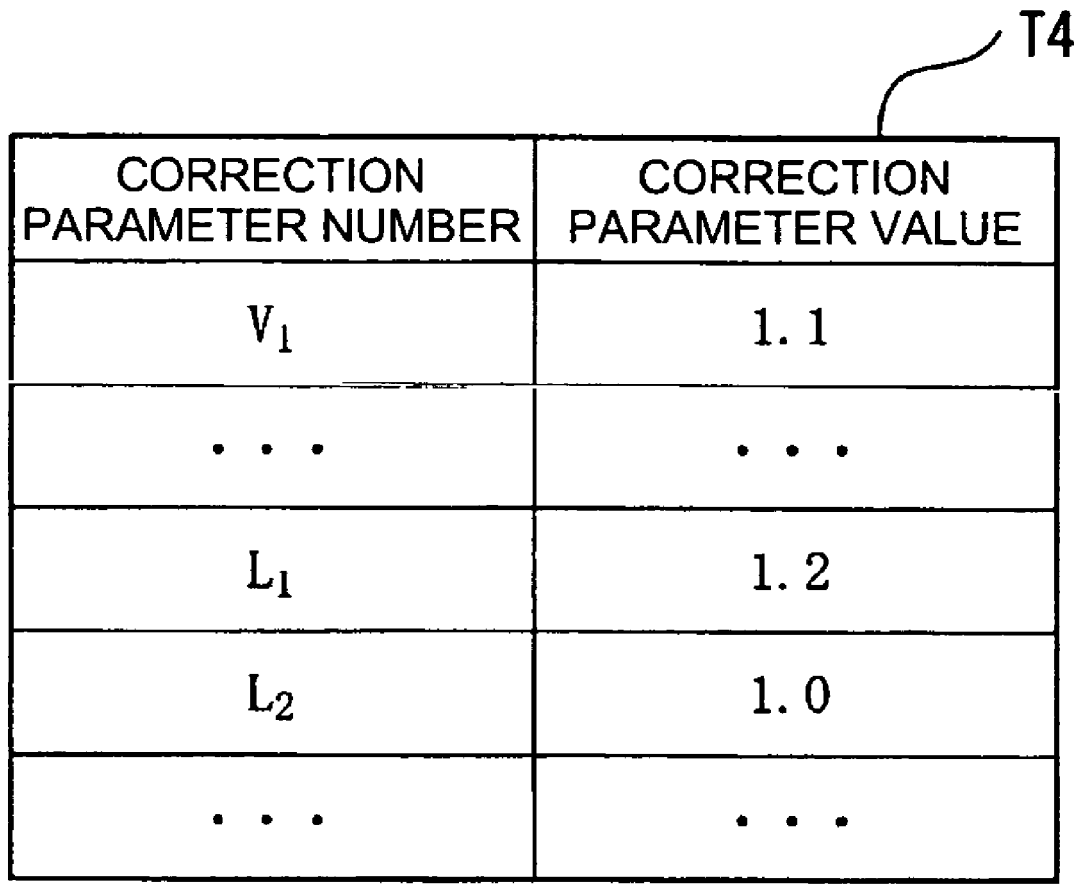
FIG. 19 is a view schematically illustrating the data structure of the generated correction value in the embodiment.

Specifically, for example, as shown in FIG. 17, assuming that a value $V_1$ is set as an element value by setting the triangle element nodes A to F on the closed region boundary L1 and a closed region boundary L2 and setting triangle element regions 1 to 4 between the closed region boundary L1 and the closed region boundary L2, the correction data generating unit 414 generates tables T3 and T4 shown in FIGS. 18 and 19.

The table T3 has a structure which stores node position information $(x_A, y_A)$, $(x_B, y_B)$, $(x_F, y_F)$, . . . , an element value $V_1$, and element node values $L_1$ and $L_2$ as one record according to triangle element regions 1, 2, 3, 4, . . . For example, in the triangle element region 1 specified by the element number 1, the node position information is $(x_A, y_A)$, $(x_B, y_B)$, $(x_F, y_F)$, the element value is $V_1$, each of the element node values of nodes A and B located on the closed region boundary L1 is $L_1$, and the element node value of the node F located on the closed region boundary L2 is $L_2$.

Here, in the table T3, the element value $V_1$ and the element node values $L_1$ and $L_2$ are set as correction parameters, and specific correction data is stored in a correction value table T4 shown in FIG. 19.

In the correction value table T4, the specific correction data according to the element value $V_1$ and the element node values $L_1$ and $L_2$ is stored, a correction process is performed for each triangle element region by using the correction data stored in both the tables T3 and T4.

Further, even though the element value $V_1$ is a correction parameter for correcting the inside of the triangle element region, the element node values $L_1$ and $L_2$ are set as correction parameters at nodes. Accordingly, when the element value $V_1$ is not used to perform the correction, the element node values $L_1$ and $L_2$ can be used as correction data by interpolation-operating the element node values $L_1$ and $L_2$.

2. Operation of Correction Data Generating Device 1

Figure 20:
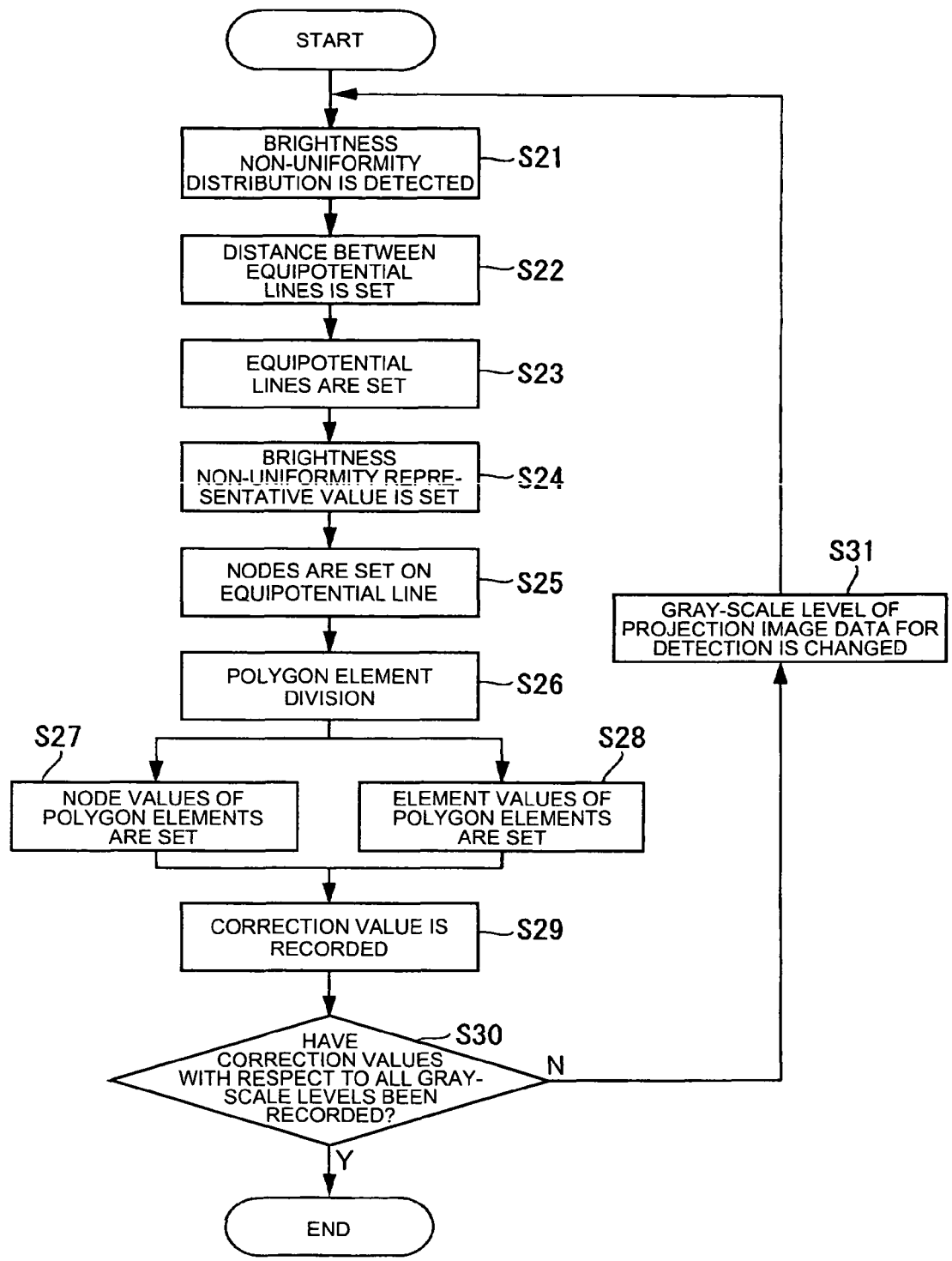
FIG. 20 is a flowchart illustrating an operation of the correction data generating device in the embodiment.

Next, an operation of the correction data generating device 1 having the above-mentioned functional units will be described with reference to a flowchart shown in FIG. 20.

The brightness non-uniformity detection unit 411 inputs the projection image data TP for brightness non-uniformity detection to the projector 100 which is an object to be corrected, captures the projection image data TP by using the CCD camera 3, and acquires the brightness non-uniformity distribution on the basis of the captured data (process S21: process of detecting distribution).

The equipotential line setting unit 412 acquires the maximum and minimum values of brightness non-uniformity on the basis of the acquired brightness non-uniformity distribution, acquires a histogram, and sets the distance between equipotential lines on the basis of the histogram (process S22: process of setting the distance between equipotential lines).

Subsequently, the equipotential line setting unit 412 sets equipotential lines on the brightness non-uniformity distribution on the basis of the set distance between equipotential lines (process S23: process of setting equipotential lines).

When equipotential lines are set, the representative value setting unit 413 sets, as a representative value, a brightness correction parameter of each equipotential line according to the brightness non-uniformity value of each equipotential line on the basis of data on the equipotential line set by the equipotential line setting unit 412 and the relation table between brightness non-uniformity and brightness non-uniformity correction parameters (process S24).

When the representative value setting unit 413 completes setting the representative value, the polygon division unit 415 in the correction data generating unit 414 sets a plurality of nodes on the equipotential lines (process S25: process of setting nodes), and divides space between closed region boundaries formed by the equipotential lines into a plurality of triangle element regions (process S26: process of setting a division element).

Then, for each of the divided triangle element regions, the node value setting unit 416 sets element node values set on the closed region boundary (process S27: process of setting a correction value) and the element value setting unit 417 sets an element value in each of the triangle element regions (process S28: process of setting a correction value).

The correction data generating unit 414 records correction data in a predetermined gray scale in the correction data storage unit 101 of the projector 100, which is an object to be corrected, by matching the set element node value, the element value, the node position information, and the element number of the triangle element region (process S29).

The correction data generating unit 414 determines whether or not correction data on images having all gray-scale levels has been recorded (process S30). Then, if it is determined that the correction data on images having all gray-scale levels has not been recorded, the correction data generating unit 414 changes the gray-scale level of projection image data for brightness non-uniformity detection (process S31) and restarts from the process S21. Then, if it is confirmed that correction data in all gray-scale levels has been recorded, the process is completed.

3. Configuration of Projector 100

Figure 21:
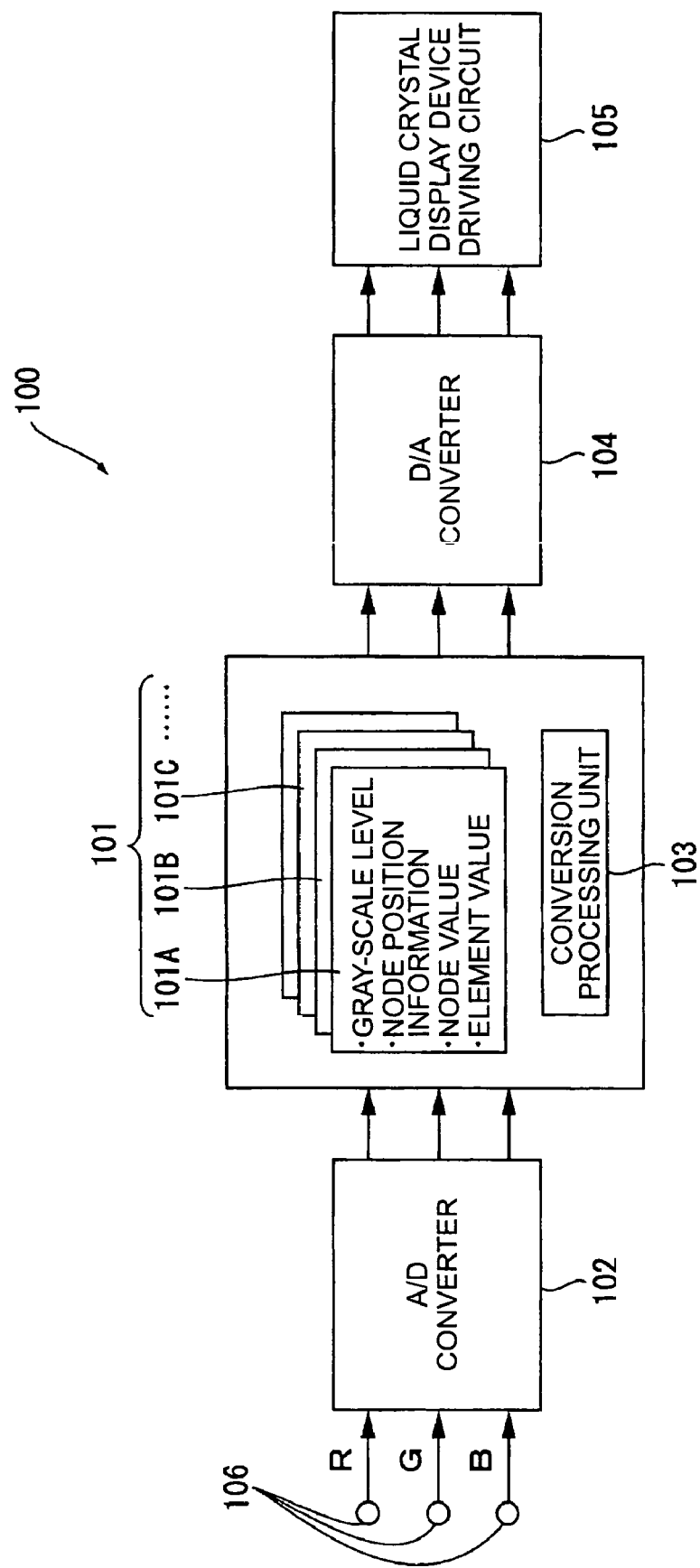
FIG. 21 is a view schematically illustrating an image processing circuit of a projector having a correction data storage unit in which a correction value generated by the correction data generating device in the embodiment is stored.

An image processing circuit of the projector 100, for which the correction data is generated by the correction data generating device 1, includes an A/D converter 102, a conversion processing unit 103, a D/A converter 104, and a liquid crystal display device driving circuit 105, as shown in FIG. 21. Image signals inputted from RGB terminals 106 are processed by the image processing circuit so as to form optical images on a liquid crystal display device.

The A/D converter 102 converts image signals inputted as analog signals into digital signals, and the digitalized image signals are output to the conversion processing unit 103.

The conversion processing unit 103 serving as a correction processing unit includes a correction data storage unit 101 storing correction data generated by the correction data generating device 1. The conversion processing unit 103 converts inputted image signals on the basis of the correction data storage unit 101 and corrects the image signals so as to have a brightness value corresponding to each of the image signals.

In the correction data storage unit 101, a plurality of correction data tables 101A, 101B, 101C, . . . which store node position information, node values, and element values corresponding to different gray-scale levels are stored. The conversion processing unit 103 selects one of the correction data tables 101A, 101B, 101C, . . . corresponding to the gray-scale level of an inputted image signal so as to correct the image signal. In addition, the gray-scale level of an inputted image signal is determined in a frame unit, and the determination may be made on the basis of the average brightness value of the entire screen or the brightness value in a region having the largest area.

Further, image signals corrected by the conversion processing unit 103 are output to the next-stage D/A converter 104.

The D/A converter 104 converts the image signals corrected by the conversion processing unit 103 into analog signals and then outputs the analog image signals to the liquid crystal display device driving circuit 105.

The liquid crystal display device driving circuit 105 drives a liquid crystal display device on the basis of the corrected image signals inputted through the D/A converter 104 such that projection images without brightness non-uniformity are projected onto a screen.

According to the projector 100 having the correction data storage unit 101, since the brightness non-uniformity correction value is set according to the brightness non-uniformity of an image displayed on a screen by storing the correction data tables 101A, 101B, 101C, . . . for each gray-scale level with the extreme values of the brightness non-uniformity as nodes, the brightness non-uniformity can be corrected in high precision. As a result, it is possible to provide a projector capable of displaying a high-quality image with a minimum amount of data.

Second Embodiment

1. Configuration of Correction Data Generating Device B1

(1) Configuration of Overall Device

Figure 22:
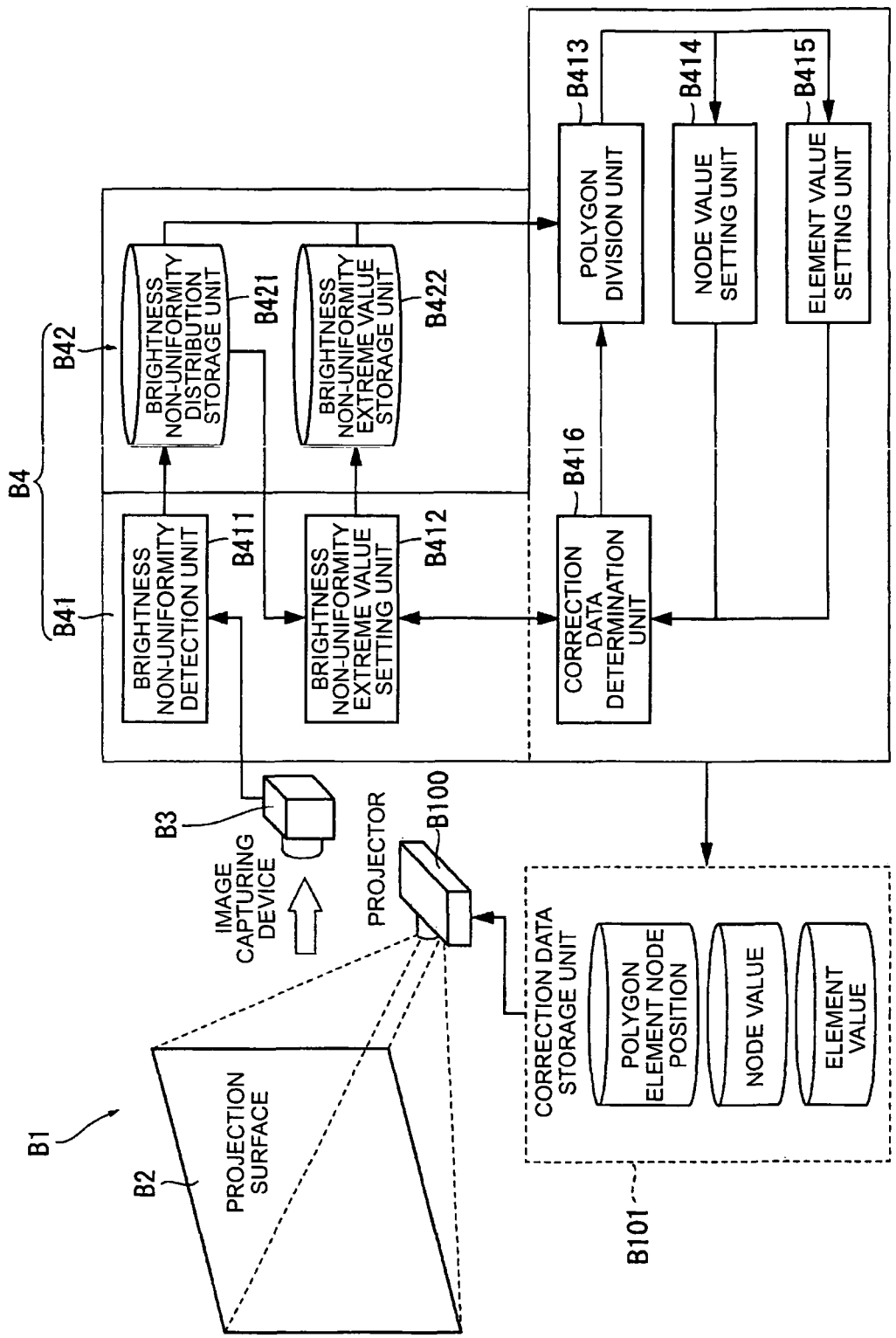
FIG. 22 is a view schematically illustrating the configuration of a correction data generating device according to another embodiment of the invention.

FIG. 22 is a view schematically illustrating a correction data generating device B1 of a projector according to a second embodiment of the invention. The correction data generating device B1 includes a screen B2, a CCD camera B3, and a computer B4, and generates correction data for correcting the brightness non-uniformity of a projection image, for which the correction data is generated, projected from a projector B100, the brightness non-uniformity being determined by distribution of an output characteristic value.

On the screen B2, the projection image for which the correction data is generated is projected from the projector B100. The CCD camera B3 serves as an image capturing device that captures a projection image projected on the screen B2, and the image captured by the CCD camera B3 is converted into an electrical signal to be output to the computer B4.

The computer B4 reads the image captured by the CCD camera B3 and then performs an image processing so as to generate correction data of the projector B100.

The correction data generated by the computer B4 is stored in a correction data storage unit B101, such as a memory, provided in the projector B100. As will be described in detail later, when the projector B100 projects an image, an image signal is corrected by using the correction data stored in the correction data storage unit B101 and then the image is projected.

The computer B4 includes an operation processing unit B41 and a storage device B42, and an electrical signal according to an image captured by the CCD camera B3 is converted into digital image data to be processed by the operation processing unit B41.

The operation processing unit B41 includes a brightness non-uniformity detection unit B411, a brightness non-uniformity extreme value setting unit B412, a polygon division unit B413, a node value setting unit B414, an element value setting unit B415, and a correction data determination unit B416. In the storage device B42, a brightness non-uniformity distribution storage unit B421 and a brightness non-uniformity extreme value storage unit B422 are provided in a part of a storage area so as to store a detected value, a set value, or the like.

(2) Configuration of Functional Units in Operation Processing Unit B41

(2-1) Configuration of Brightness Non-Uniformity Detection Unit B411

Figure 23:
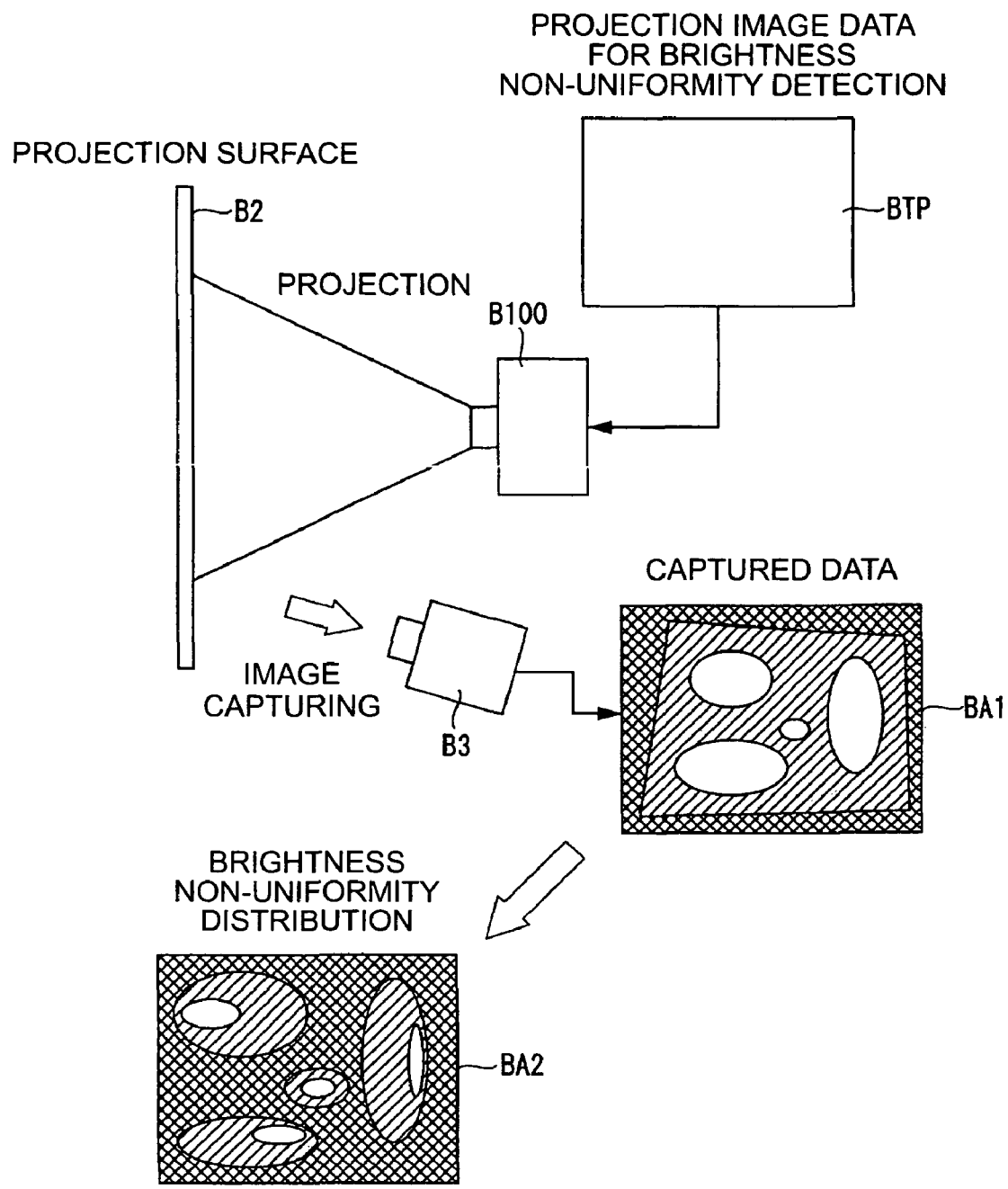
FIG. 23 is a view schematically illustrating the brightness non-uniformity detection performed by a brightness non-uniformity detection unit in the embodiment.
Figure 24:
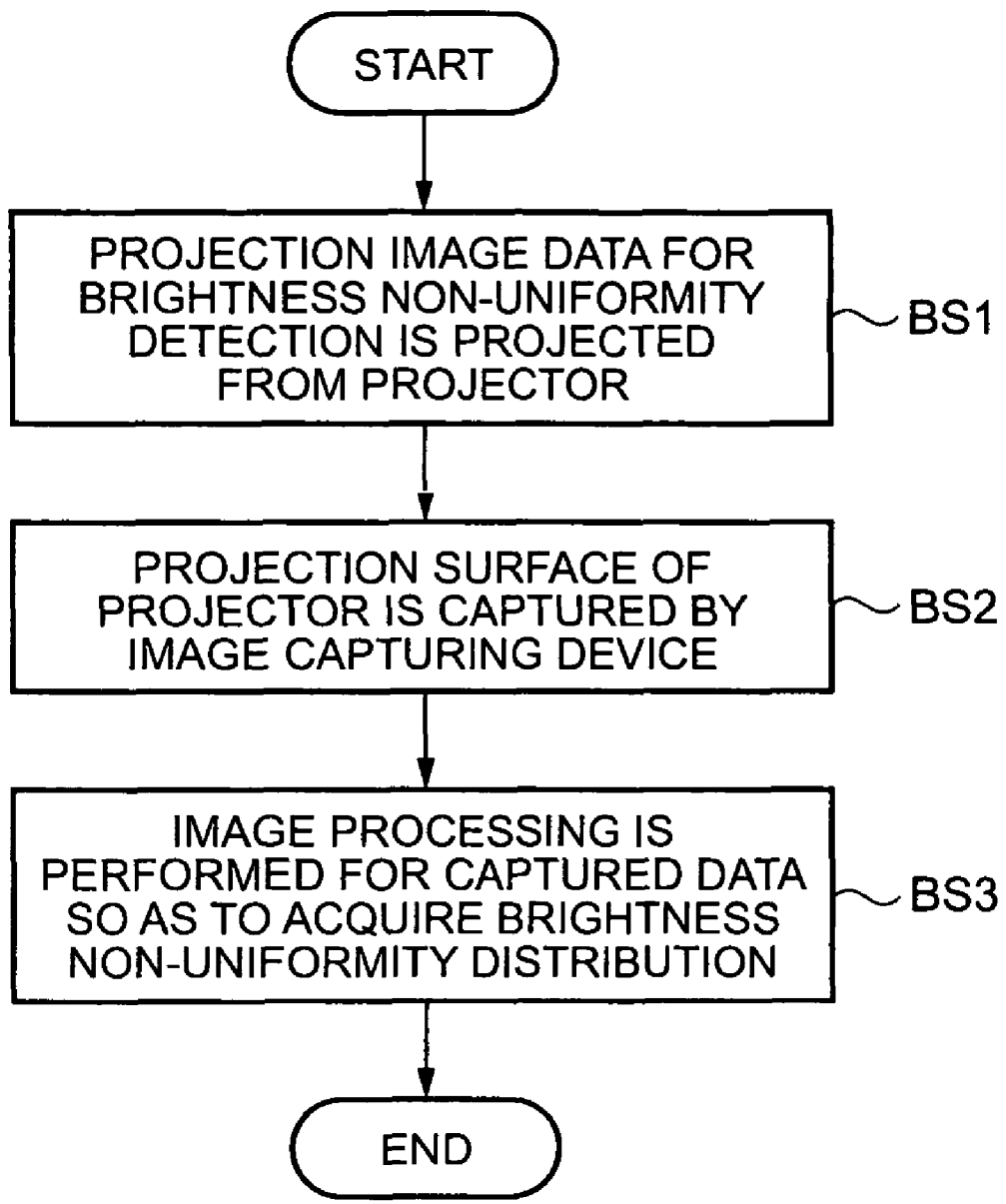
FIG. 24 is a flowchart illustrating an operation of the brightness non-uniformity detection unit in the embodiment.

The brightness non-uniformity detection unit B411 detects the brightness non-uniformity on the basis of an output from the CCD camera B3 which captures a projection image projected from the projector 100, and specifically, the brightness non-uniformity detection unit B411 performs processes shown in FIGS. 23 and 24.

First, the brightness non-uniformity detection unit B411 inputs projection image data BTP for brightness non-uniformity detection to the projector B100 for which correction data is generated, and the projector B100 projects a projection image according to the image data onto a projection surface of the screen B2 (process BS1). At this time, the projection image data BTP for brightness non-uniformity detection displays a single-color image having a predetermined gray-scale level.

Then, the brightness non-uniformity detection unit B411 captures the projection image projected onto the projection surface by using the CCD camera B3 serving as an image capturing device, and then loads captured data BA1 as digital data (process BS2).

Finally, the captured data BA1 is subjected to an image processing, in which the brightness non-uniformity is precisely reflected, so as to acquire brightness non-uniformity distribution BA2 which becomes the distribution of an output characteristic value, and the data having been subjected to the image processing is stored in the brightness non-uniformity distribution storage unit B421 (process BS3: distribution detection process).

(2-2) Configuration of Brightness Non-Uniformity Extreme Value Setting Unit B412

The brightness non-uniformity extreme value setting unit B412 sets the extreme values of the brightness non-uniformity on the basis of the acquired brightness non-uniformity distribution. Specifically, the brightness non-uniformity extreme value setting unit B412 performs processes shown in FIGS. 25 and 26.

First, the brightness non-uniformity extreme value setting unit B412 acquires the brightness non-uniformity distribution BA2 stored in the brightness non-uniformity distribution storage unit B421 (process BS4).

Then, when the brightness non-uniformity distribution BA2 is acquired, the brightness non-uniformity extreme value setting unit B412 calculates a part, in which the brightness value is higher or lower than those therearound, in the brightness non-uniformity distribution BA2 (process BS5). Specifically, as shown by BA3 in FIG. 25, if it is determined that the extreme values of brightness non-uniformity are like an image BA31, the brightness non-uniformity extreme value setting unit B412 calculates an extreme value number of each point, the position of an extreme value, and the extreme value, in the same manner as in a table BA32.

Figure 27:
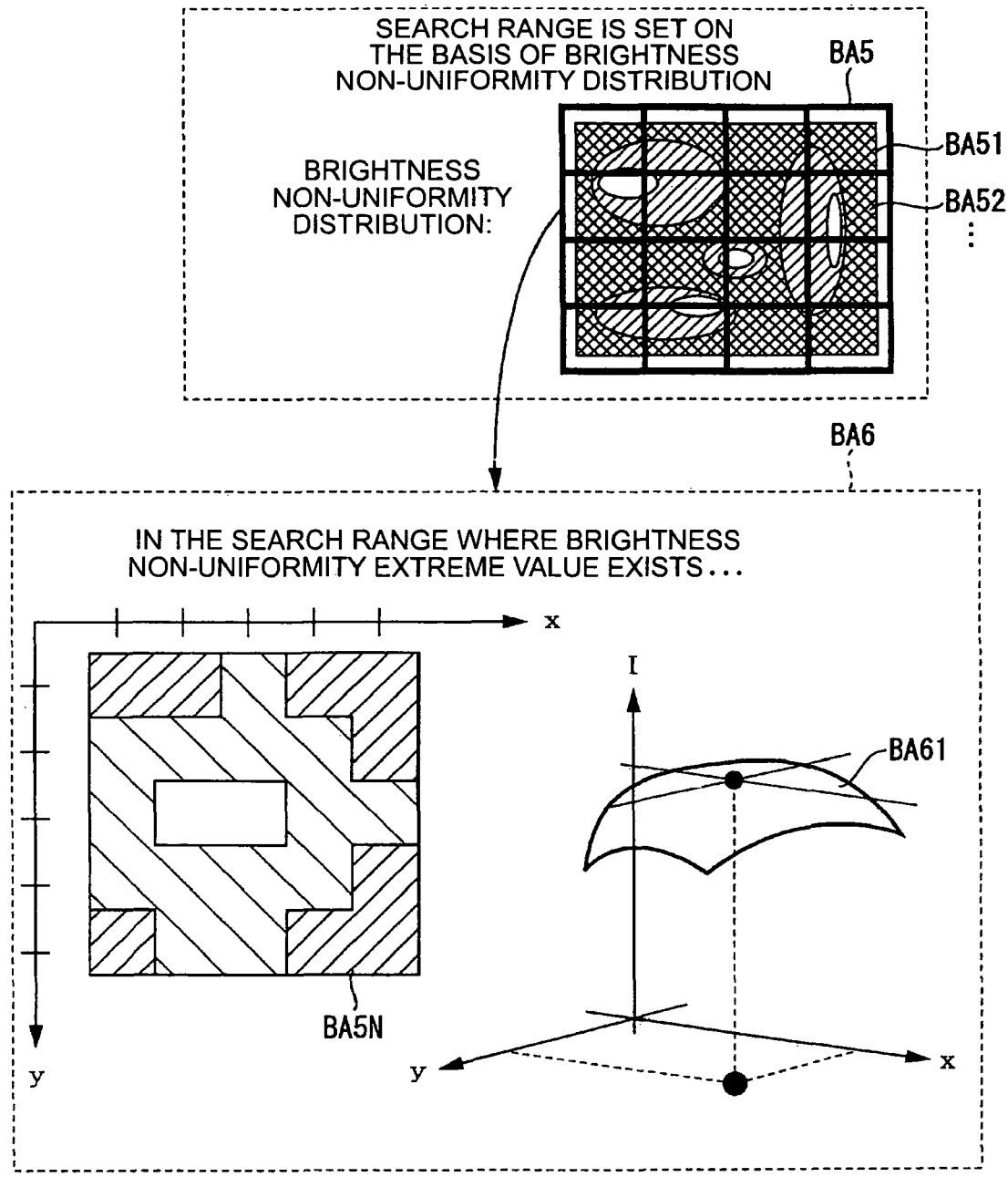
FIG. 27 is a schematic view for explaining a method of setting a brightness non-uniformity extreme value in the embodiment.
Figure 28:
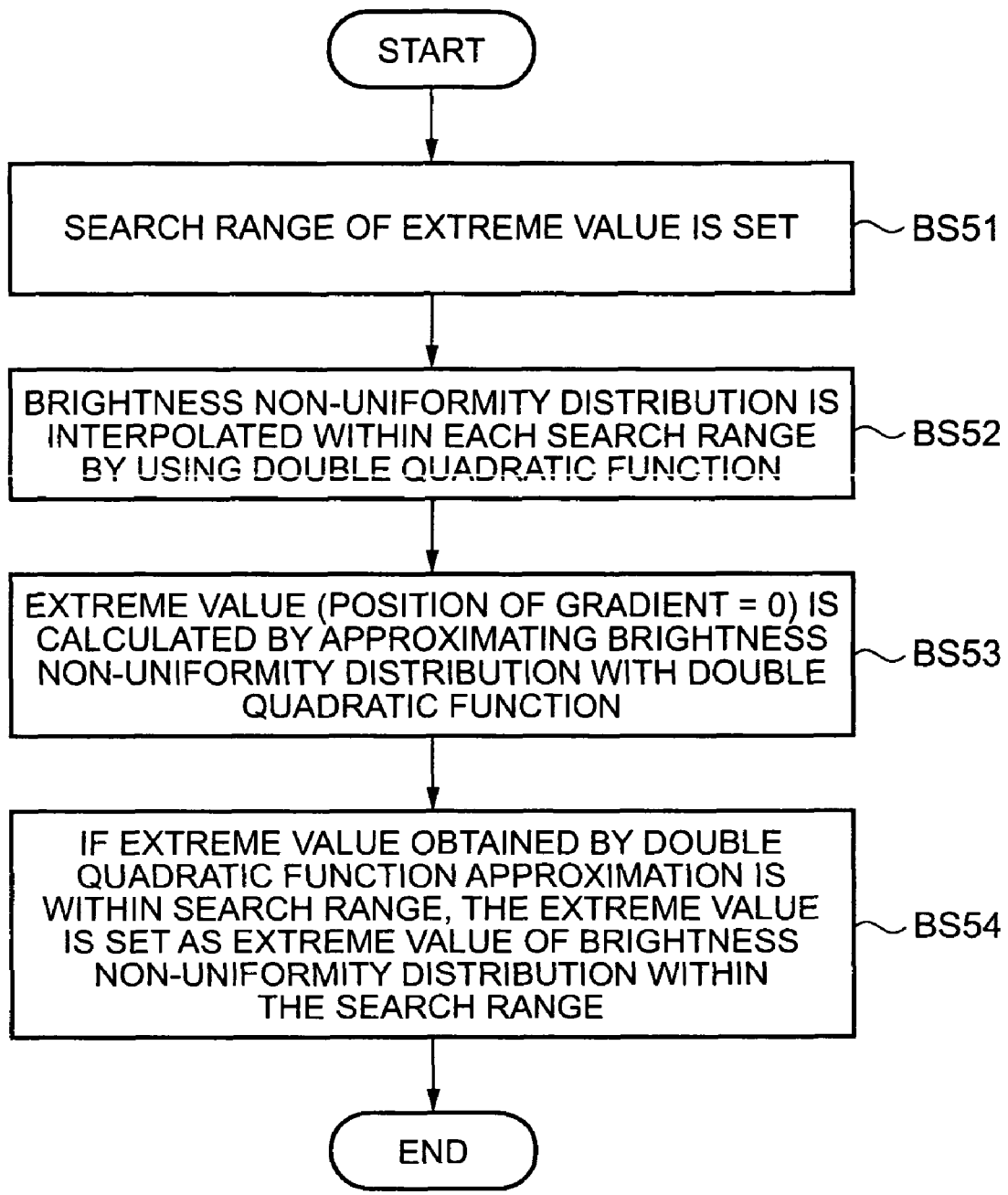
FIG. 28 is a flowchart illustrating the procedure of setting a brightness non-uniformity extreme value.

Here, the extreme values of brightness non-uniformity may be determined by performing processes shown in FIGS. 27 and 28.

First, as shown in FIG. 27, the brightness non-uniformity extreme value setting unit B412 sets a plurality of extreme value search ranges BA51, BA52, . . . within an acquired brightness non-uniformity distribution BA5 (process BS51).

Then, the brightness non-uniformity extreme value setting unit B412 interpolates the brightness non-uniformity distribution within each search range with a double quadratic function, in each of the search ranges BA51, BA52, . . . (process BS52).

As shown in FIG. 27, the brightness non-uniformity extreme value setting unit B412 calculates the extreme value of an approximate function (gradient of an approximate function=0) by using a double quadratic function BA61 which approximates the brightness non-uniformity distribution within a predetermined search range BA5N (process BS53).

Finally, the brightness non-uniformity extreme value setting unit B412 determines whether or not an extreme value exists within the search range BA5N, and sets the extreme value as an extreme value if it exists (process BS54).

Next, referring back to FIGS. 25 and 26, the brightness non-uniformity extreme value setting unit B412 sets an extreme value, which is to be used as a node value, among obtained extreme values, and stores data, which is included in a group of the set extreme value points, in the brightness non-uniformity extreme value storage unit B422 (process BS6: process of setting an extreme value).

Figure 25:
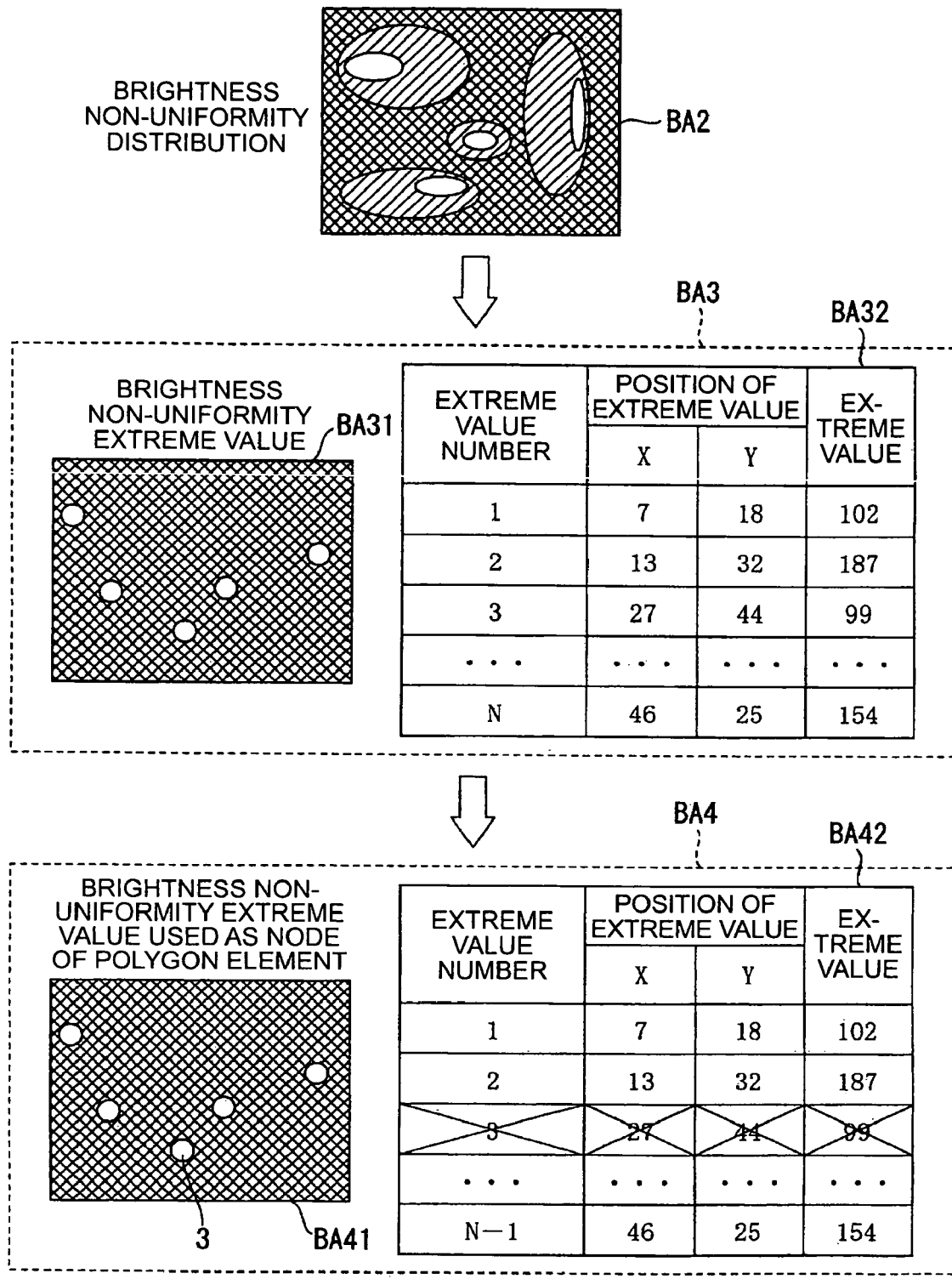
FIG. 25 is a view schematically illustrating a process of setting a brightness non-uniformity extreme value by using a brightness non-uniformity extreme value setting unit in the embodiment.
Figure 26:
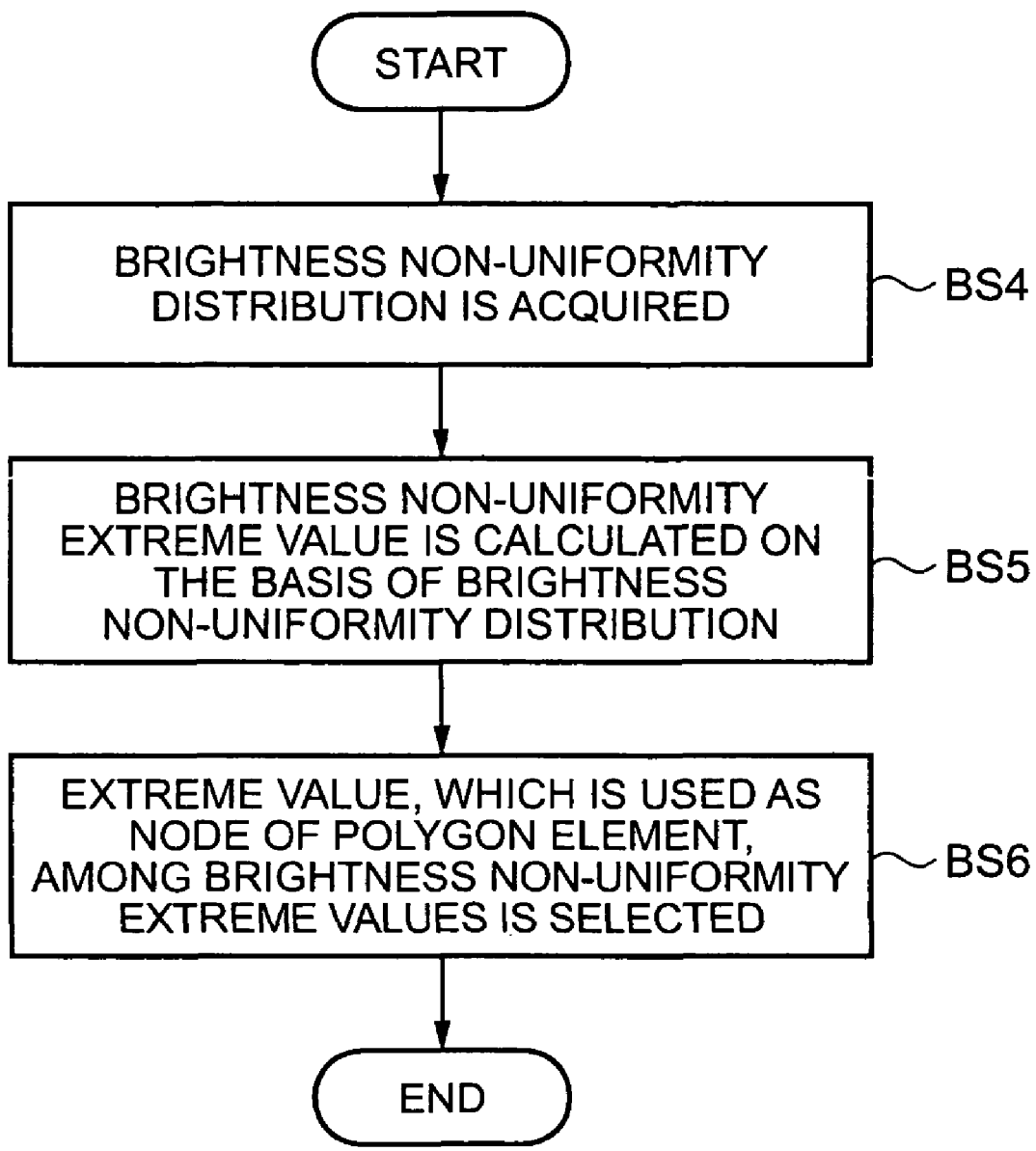
FIG. 26 is a flowchart illustrating an operation of the brightness non-uniformity extreme value setting unit in the embodiment.

Extreme values used as node values are set, for example, as shown by BA4 of FIG. 25, in which, when the brightness non-uniformity of an extreme value portion and the brightness non-uniformity around the extreme value portion are slightly different from each other, an extreme value is deleted according to the necessity. In addition, in order to delete an extreme value, a threshold value is prepared beforehand and a determination is made according to whether the extreme value exceeds the threshold value or not. For example, in FIG. 25, if the deflection of brightness non-uniformity in an extreme value portion corresponding to a point 3 of an image BA41 is determined to be small, it is possible to delete an extreme value by deleting a record corresponding to an extreme value number 3 in a table BA42 including calculated extreme value numbers, the positions of extreme values, and extreme values.

(2-3) Configuration of Polygon Division Unit B413

Figure 29:
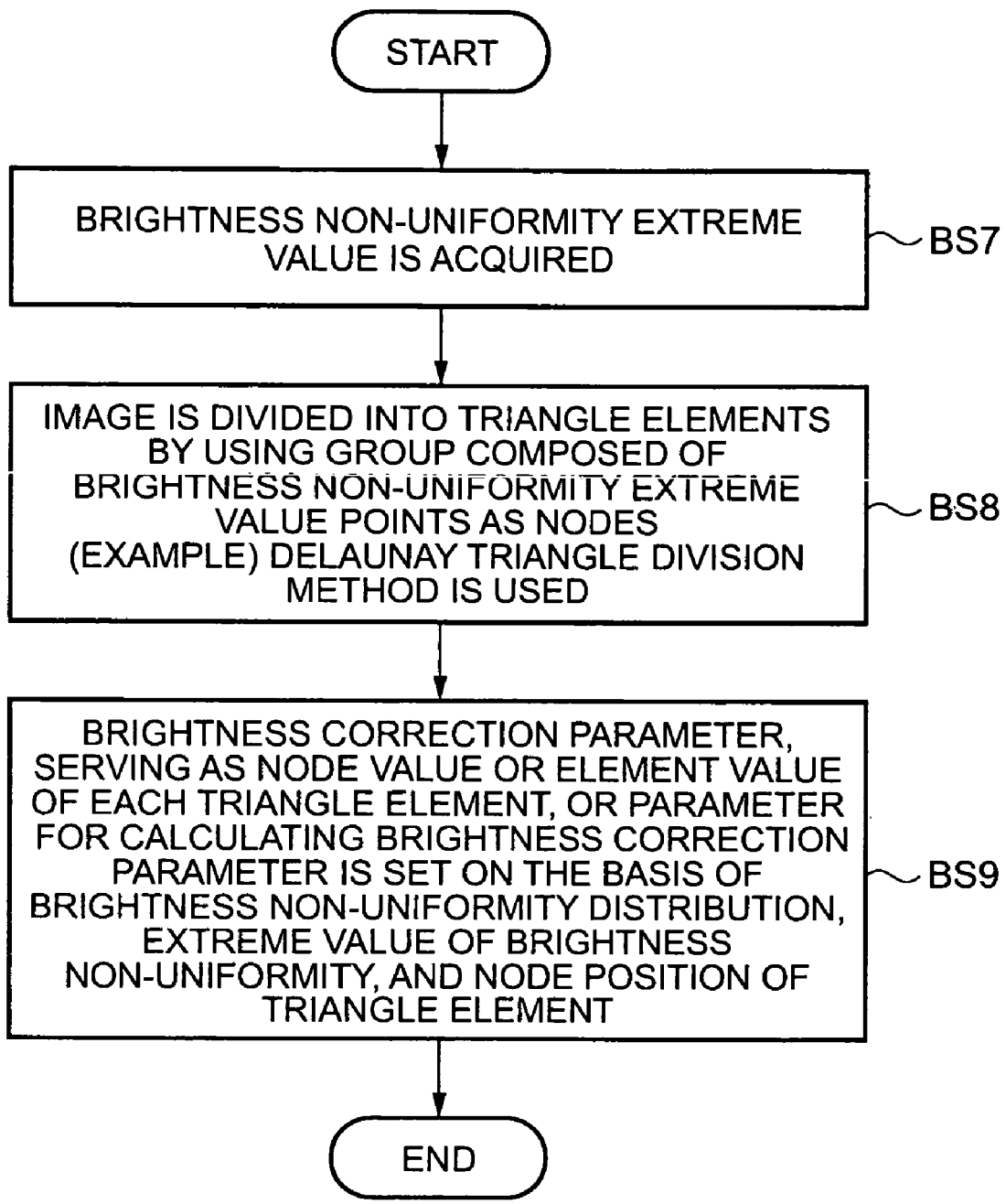
FIG. 29 is a flowchart illustrating the procedure of dividing a polygon element region by using a polygon division unit in the embodiment.

The polygon division unit B413 divides an image displayed on a screen into polygon element regions by using extreme values as nodes on the basis of data included in a group of set extreme value points set by the brightness non-uniformity extreme value setting unit B412. Specifically, the polygon division unit B413 performs processes shown in FIGS. 29 and 30.

First, the polygon division unit B413 acquires a brightness non-uniformity extreme value stored in the brightness non-uniformity extreme value storage unit B422 (process BS7).

The polygon division unit B413 divides an image displayed on a screen into a plurality of element regions by using polygon element regions having a point group composed of brightness non-uniformity extreme values as nodes, on the basis of the acquired brightness non-uniformity extreme value (process BS8: process of setting division elements).

Figure 30:
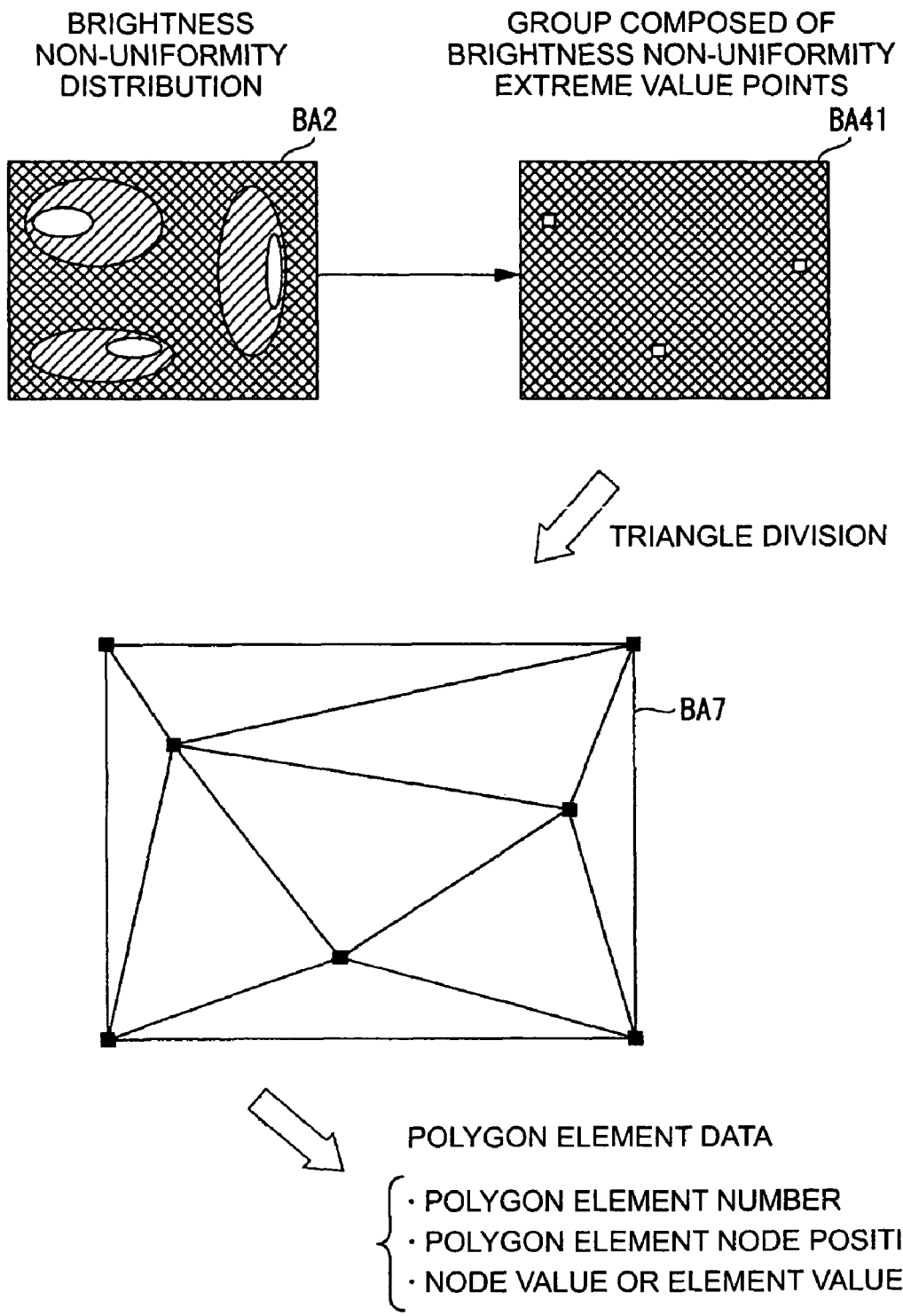
FIG. 30 is a schematic view for explaining a method of dividing a polygon element region by using the polygon division unit in the embodiment.

For example, a Delaunay triangle division method in which a triangle element region is set as a triangle may be used for the division of an element region. That is, as shown in FIG. 30, the brightness non-uniformity extreme value setting unit B412 obtains the point group composed of brightness non-uniformity extreme values, such as an image BA41, on the basis of the brightness non-uniformity distribution BA2 detected by the brightness non-uniformity detection unit B411, and the polygon division unit B413 performs an element division by using the extreme values as nodes so that the image BA41 is divided into a plurality of triangle elements like an image BA7.

(2-4) Configurations of Node Value Setting Unit B414 and Element Value Setting Unit B415

Figure 31:
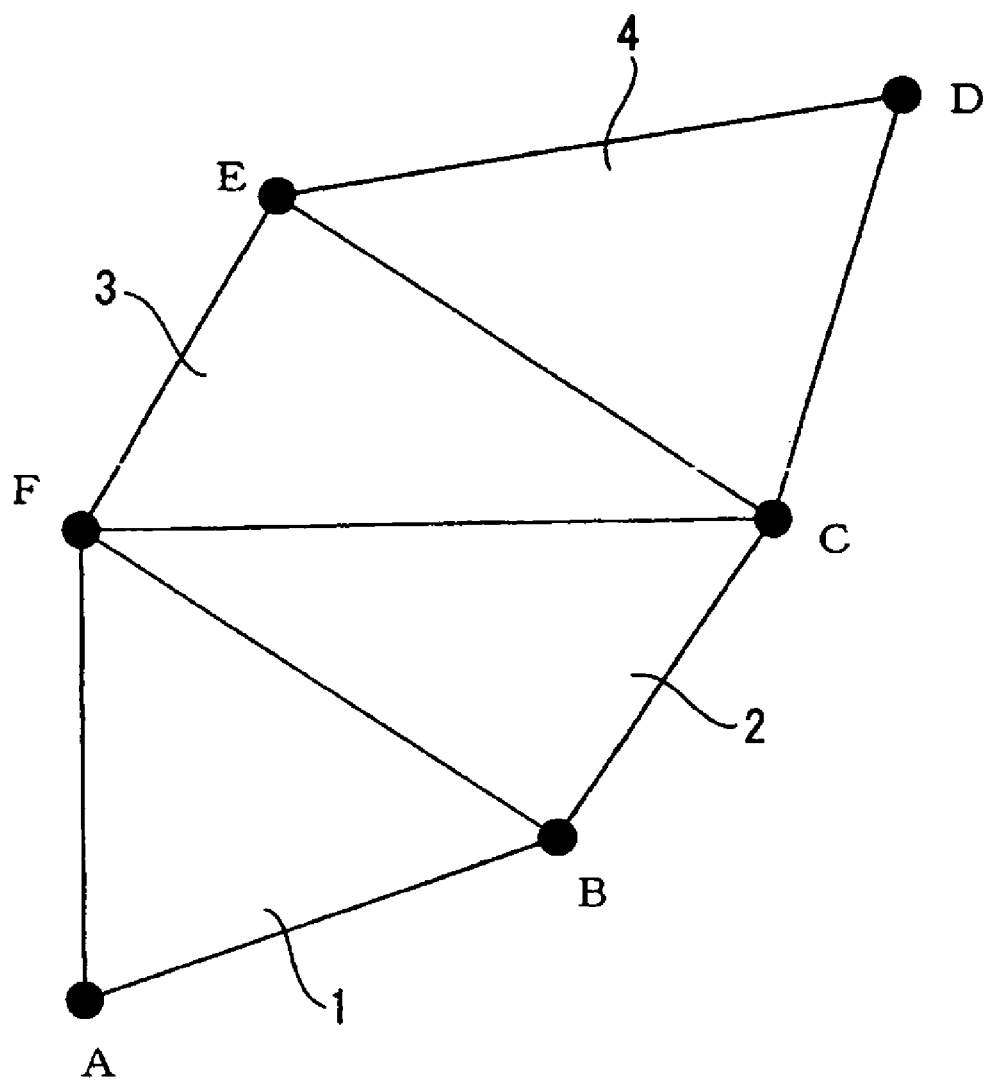
FIG. 31 is a schematic view for explaining a generated correction value in the embodiment.

The node value setting unit B414 and the element value setting unit B415 set correction values according to triangle elements divided by the polygon division unit B413. For example, as shown in FIG. 31, assuming that an image is divided into four triangle elements 1 to 4, when the node values of, for example, the element 1 are set, the node value setting unit B414 sets the node values of element nodes A, B, and F of the element 1, and the element value setting unit B415 sets an element value which becomes the correction value of the element 1.

Specifically, as shown in FIG. 32, the node value setting unit B414 and the element value setting unit B415 generate an element region storage table BT1 which stores the node position of a triangle element and node and element values at the node position according to a triangle element number.

For example, when an XY coordinate is set for display images to be corrected, the node positions of the element number 1 are stored such that an element node 1 is $(x_A, y_A)$, an element node 2 is $(x_B, y_B)$, and an element node 3 is $(x_F, y_F)$, and an element value is stored as an element value $V_1$, and thus element node values $L_A$, $L_B$, and $L_F$ at the element nodes 1 to 3 are stored in a record of the element number 1.

Here, even though the element value $V_1$ and the element node values $L_A$, $L_B$, and $L_F$ are brightness non-uniformity correction data (correction values) of the triangle elements of the element number 1, the element value $V_1$ and the element node values $L_A$, $L_B$, and $L_F$ are set as correction parameters in this example and value data which becomes real correction values are stored in a correction value table BT2 shown in FIG. 33. In the correction value table BT2, the value data which becomes real correction values are stored according to the correction parameters $V_1$, $L_A$, $L_B$, and $L_F$.

Further, the element value $V_1$ means brightness non-uniformity correction data (correction value) assigned for a triangle element region of the element number 1. On the other hand, when the element value $V_1$ is not used, element node values $L_A$, $L_B$, and $L_F$ are used. That is, the correction value within a triangle element region of the element number 1 is obtained by interpolation-operating the element node values $L_A$, $L_B$, and $L_F$, and thus real brightness non-uniformity correction data (correction value) within the triangle element region can be calculated.

(2-5) Configuration of Correction Data Determination Unit B416

The correction data determination unit B416 detects the brightness non-uniformity distribution of a corrected image on which a projection image, of which brightness non-uniformity has been corrected, is projected by the projector B100, on the basis of brightness non-uniformity correction data set by the polygon division unit B413, the node value setting unit B414, and element value setting unit B415, and determines whether or not the brightness non-uniformity distribution is within an allowed range. Specifically, the correction data determination unit B416 performs a process shown in FIG. 34.

Figure 34:
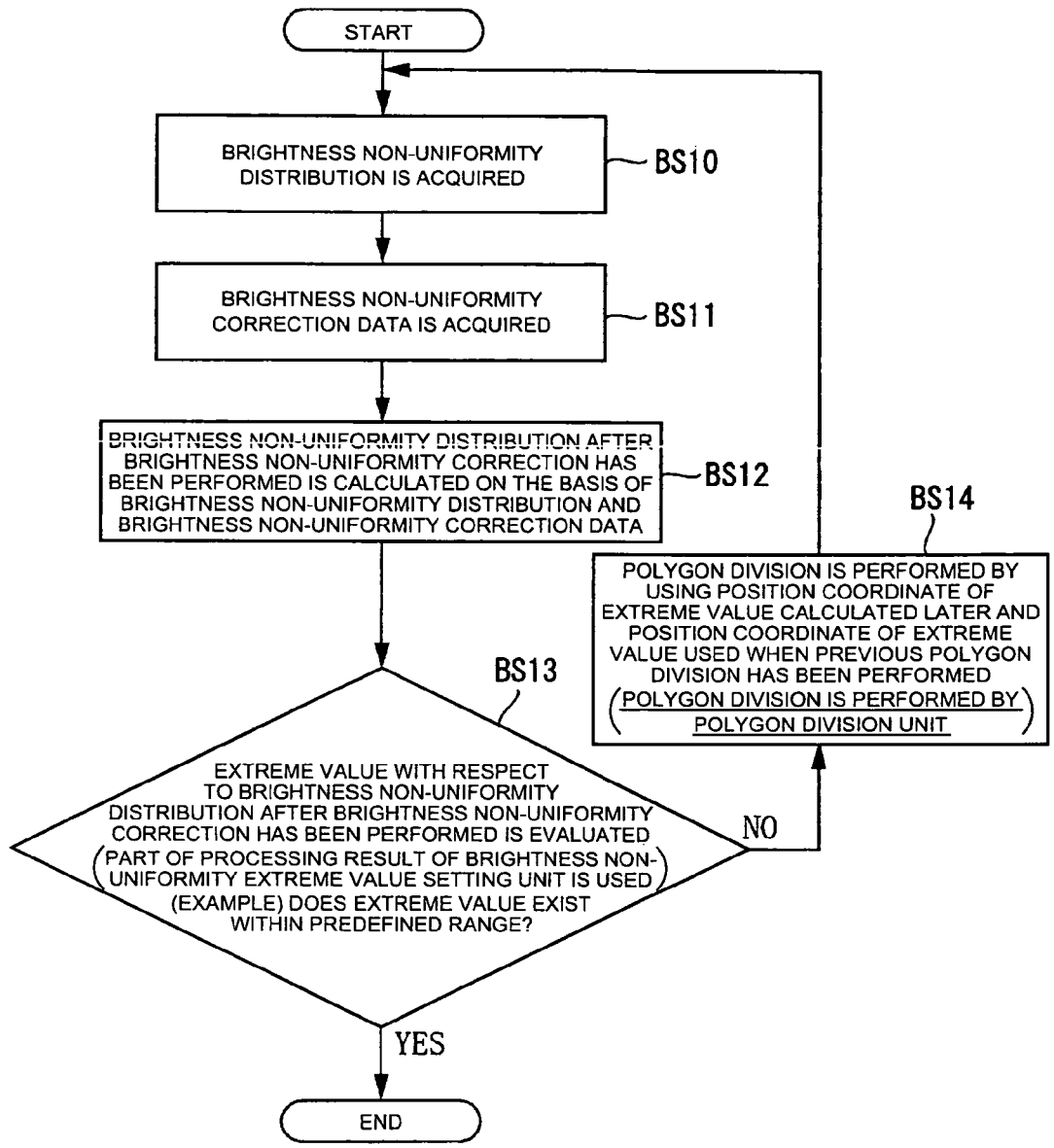
FIG. 34 is a flowchart illustrating a flow of evaluation for determining whether or not a corrected image is qualified by using a correction data determination unit in the embodiment.

First, as shown in FIG. 34, the correction data determination unit B416 outputs a control command to the brightness non-uniformity detection unit B411, outputs again the projection image data BTP for brightness non-uniformity detection to the projector B100, corrects the brightness non-uniformity of a projection image according to the projection image data BTP output from the projector B100 so as to project the projection image onto a screen, makes the brightness non-uniformity detection unit B411 acquire the brightness non-uniformity distribution (process BS10).

Then, the correction data determination unit B416 acquires brightness non-uniformity correction data (correction values) obtained by the above-mentioned units (process BS11), and calculates brightness non-uniformity distribution after a brightness non-uniformity correction has been performed, on the basis of the brightness non-uniformity distribution acquired in the process BS10 and the brightness non-uniformity correction data (process BS12: process of acquiring a distribution after a correction).

Subsequently, the correction data determination unit B416 makes the brightness non-uniformity extreme value setting unit B412 set an extreme value for the brightness non-uniformity distribution after a brightness non-uniformity correction has been performed, and determines whether or not the set extreme value is right (process BS13: process of evaluating a corrected image). Here, the determination may be made according to whether or not the extreme values of the brightness non-uniformity distribution after the brightness non-uniformity correction has been performed are within a preset threshold value range.

Depending on the determination result, if it is determined that the extreme values are within the preset threshold value range, the process is completed. On the other hand, if it is determined that the extreme values are not within the preset threshold value range, the correction data determination unit B416 additionally sets the extreme values obtained at this time in addition to the extreme values obtained when the brightness non-uniformity correction data has been set, outputs a control command to the polygon division unit B413, makes the polygon division unit B413 perform an element division, and makes the node value setting unit B414 and the element value setting unit B415 calculate an element value and an element node value on the basis of the obtained polygon element region process BS14: process of evaluating a corrected image).

Hereinafter, the evaluation on a corrected image performed by the correction data determination unit B416 will be described in more detail with reference to FIGS. 35 to 38.

Figure 35:
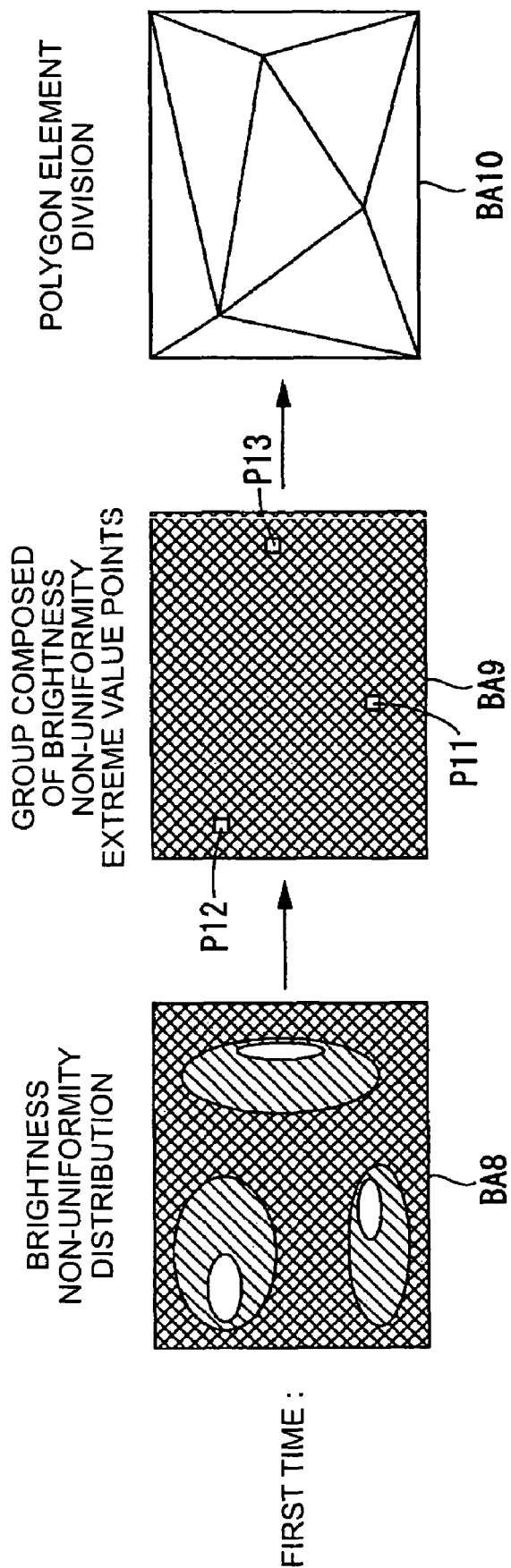
FIG. 35 is a schematic view for explaining processes of setting an extreme value again and dividing a polygon element region again after the determination on whether or not the corrected image is qualified has been made by the correction data determination unit in the embodiment.

First, as shown in FIG. 35, in order to generate brightness non-uniformity correction data by a first series of processes, distribution such as brightness non-uniformity distribution BA8 is acquired by the brightness non-uniformity detection unit B411. Based on the distribution, the extreme values P11, P12, and P13 of brightness non-uniformity are set like BA9 by the brightness non-uniformity extreme value setting unit B412 and the polygon is divided into a plurality of triangle element regions, such as BA10, by the polygon division unit B413.

Figure 36:
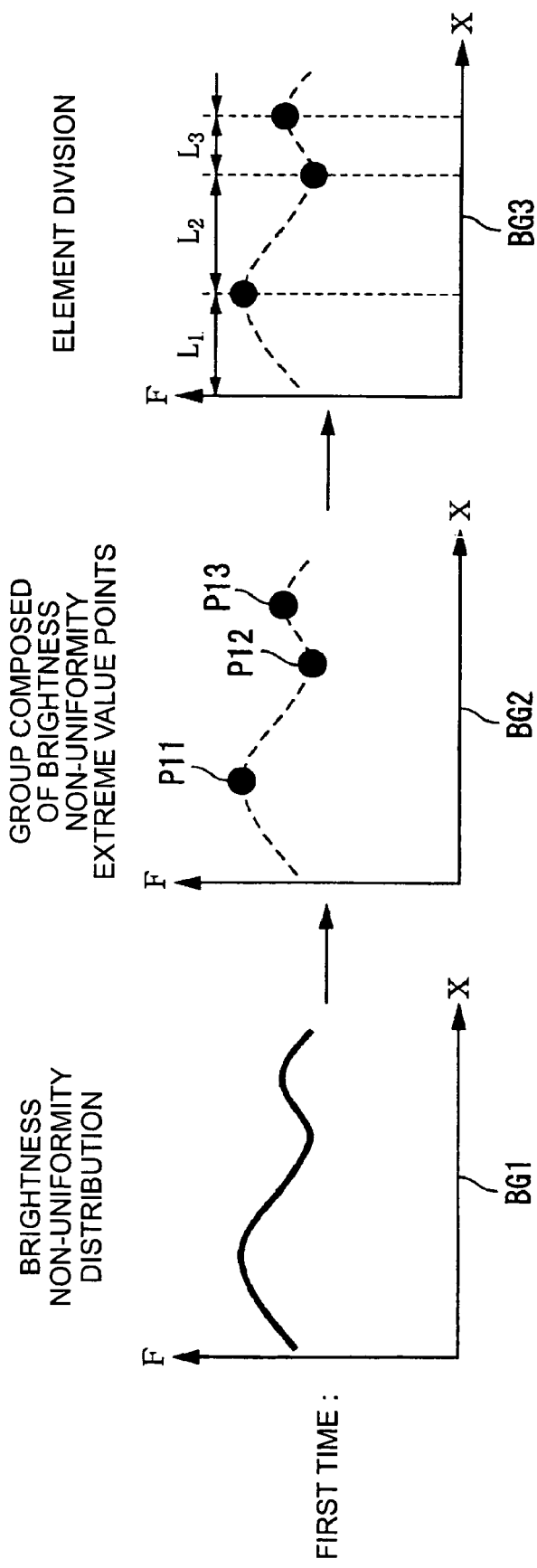
FIG. 36 is a graph for explaining processes of setting an extreme value again and dividing a polygon element region again after the determination on whether or not the corrected image is qualified has been made by the correction data determination unit in the embodiment.

If the above processes are described in a one-dimensional graph, as shown in FIG. 36, the brightness non-uniformity distribution can be understood as a curved line, such as a graph BG1, and the extreme values, such as points P11, P12, and P13, are set according to the curved line (graph BG2). Then, the extreme values P11, P12, and P13 are set as triangle division element regions L1, L2, and L3, respectively (graph BG3).

Figure 37:
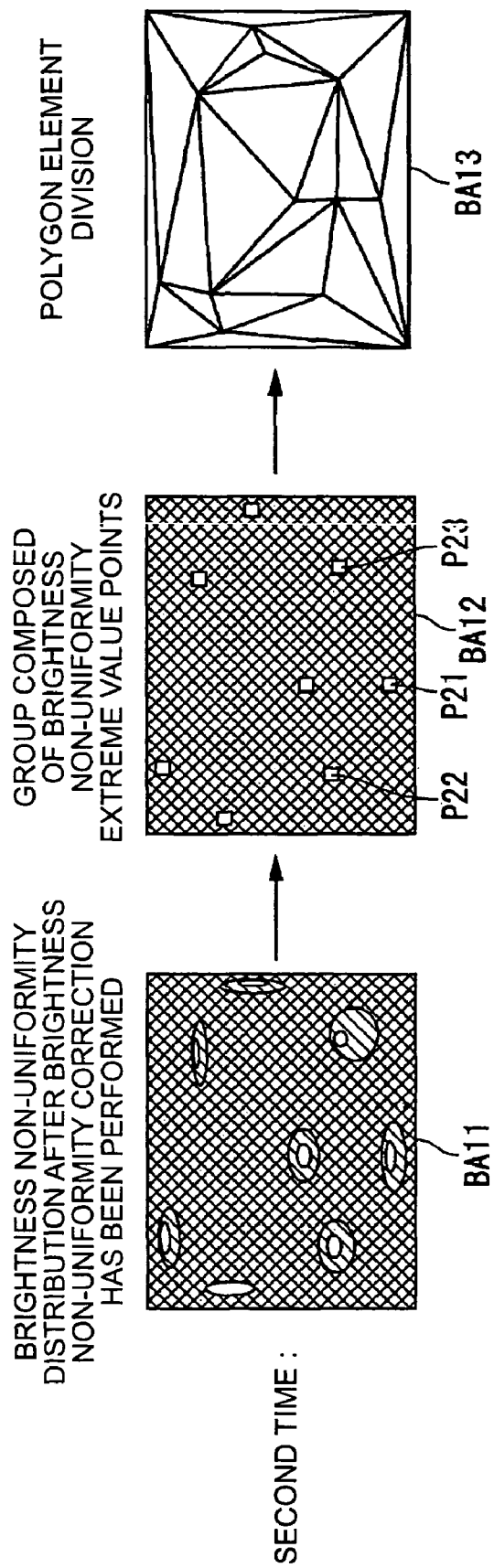
FIG. 37 is a schematic view for explaining processes of setting an extreme value again and dividing a polygon element region again after the determination on whether or not the corrected image is qualified has been made by the correction data determination unit in the embodiment.
Figure 38:
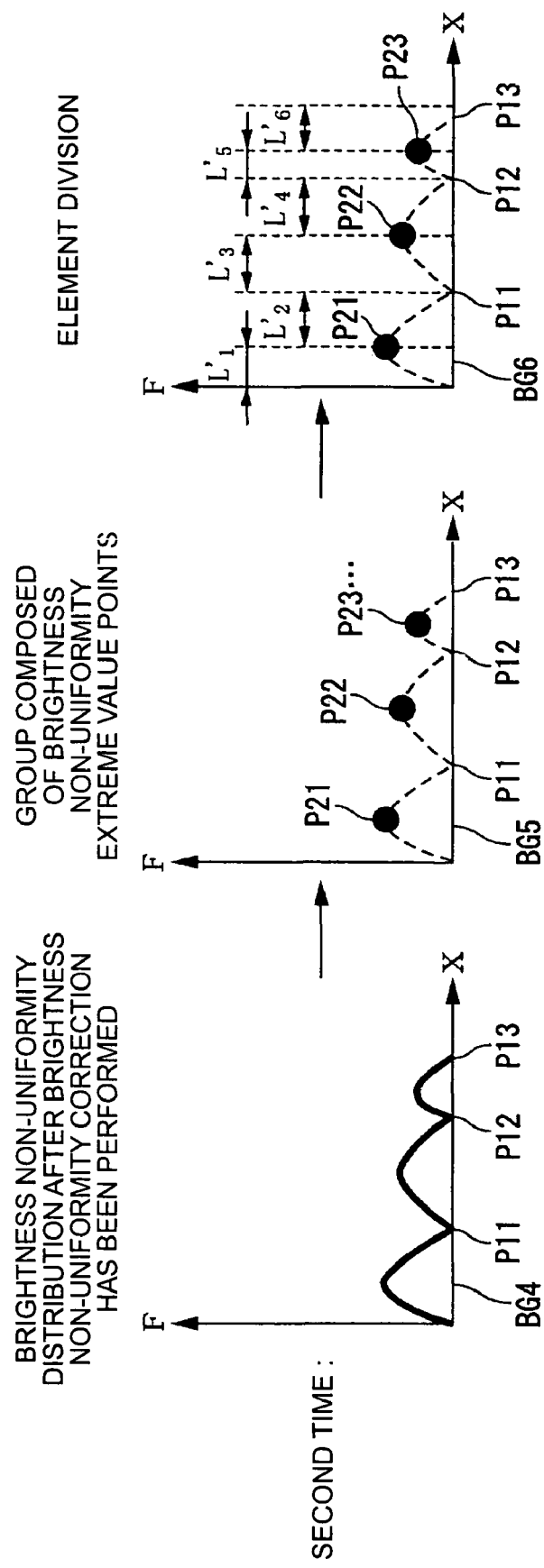
FIG. 38 is a graph for explaining processes of setting an extreme value again and dividing a polygon element region again after the determination on whether or not the corrected image is qualified has been made by the correction data determination unit in the embodiment.

Thereafter, as shown in FIG. 37, in order to generate brightness non-uniformity correction data by a second series of processes, distribution such as brightness non-uniformity distribution BA11 is acquired by the brightness non-uniformity detection unit B411. Based on the distribution, new extreme values P21, P22, P23, . . . set by the brightness non-uniformity extreme value setting unit B412 are set like BA12. Based on the newly set extreme values P21, P22, P23, . . . , the polygon is divided again, and as a result, the polygon is divided into polygon element regions smaller than those in the first series of processes, as shown by BA13.

If the above processes are described in a one-dimensional graph in the same manner as described above, as shown in FIG. 38, the brightness non-uniformity distribution after a correction is shown like a graph BG4. In addition, points intersecting with an X axis of a brightness non-uniformity distribution in the graph BG4 are extreme values P11, P12, and P13 set in the previous correction processes. Since the extreme values P11, P12, and P13 have been corrected in the first processes, the brightness non-uniformity has not been generated. Based on the graph BG4, a second extreme value setting process is performed so as to additionally set the new points P21, P22, and P23 as extreme values (graph BG5).

Further, by dividing the polygon on the basis of the new points P21, P22, and P23, the polygon is divided into polygon element regions smaller than those in the first series of processes, as shown by BG6, and accordingly, the brightness non-uniformity becomes small. As such, by repeating the polygon division several times, it becomes possible to remove the brightness non-uniformity almost completely.

2. Operation of Correction Data Generating Device B1

Figure 39:
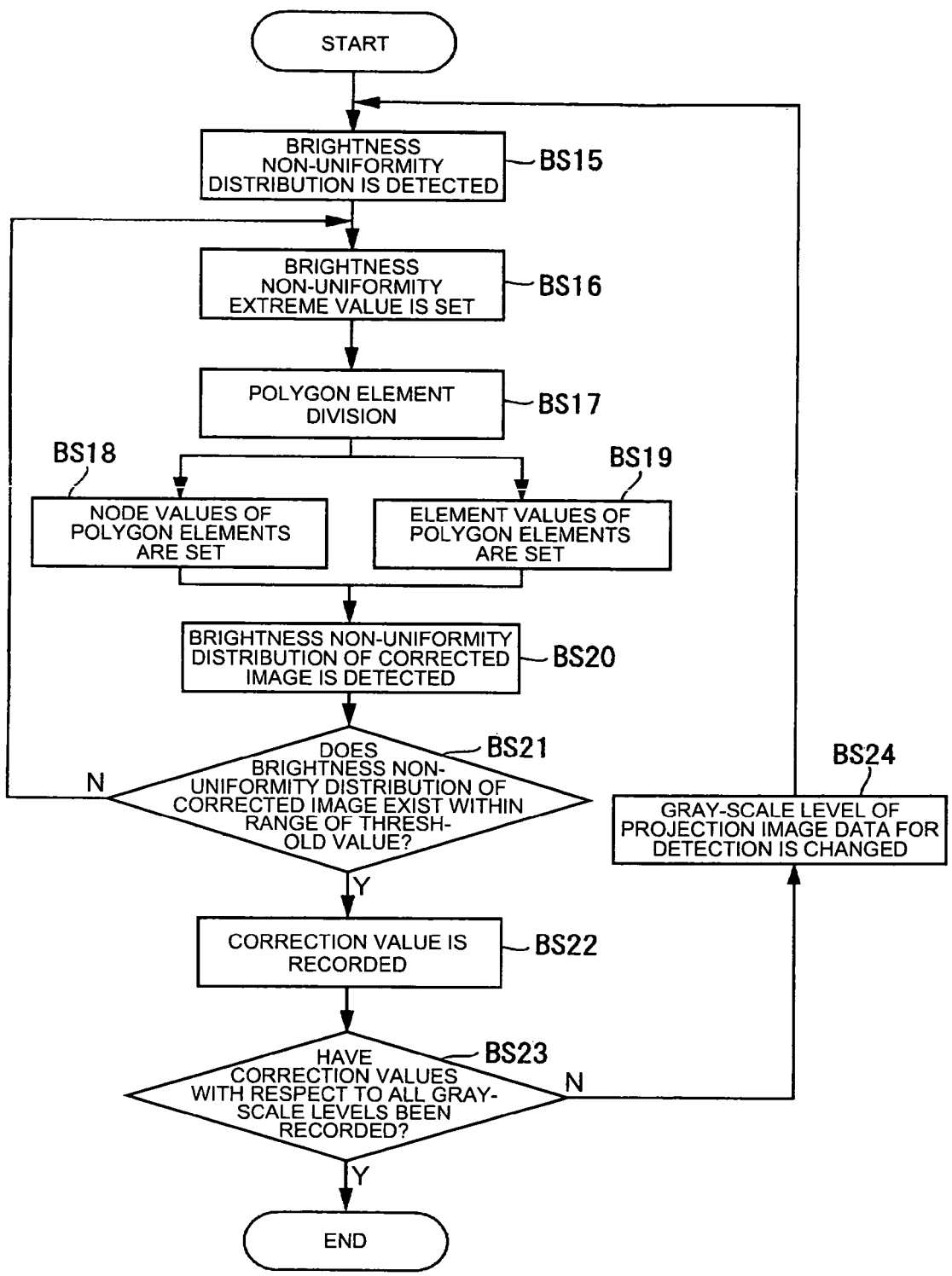
FIG. 39 is a flowchart explaining an operation of the correction data generating device in the embodiment.

Next, an operation of the correction data generating device B1 having the above-mentioned functional units will be described with reference to a flowchart shown in FIG. 39.

The brightness non-uniformity detection unit B411 inputs the projection image data BTP for brightness non-uniformity detection to the projector B100 which is an object to be corrected, captures the projection image data BTP by using the CCD camera B3, and acquires the brightness non-uniformity distribution BA2 on the basis of the captured data BA1 (process BS15: process of detecting distribution).

The brightness non-uniformity extreme value setting unit B412 sets brightness non-uniformity extreme values on the basis of the acquired brightness non-uniformity distribution (process BS16: process of setting an extreme value).

When the brightness non-uniformity extreme value setting unit B412 completes setting brightness non-uniformity extreme values, the polygon division unit B413 divides an image displayed on a screen into a plurality of element regions by using an extreme value group as nodes (process BS17: process of setting a division element).

The node value setting unit B414 sets the node values of each polygon element region (process BS18: process of setting a correction value) and the element value setting unit B415 sets the element values of each polygon element region (process BS19: process of setting a correction value), and thus the element region storage table BT1 and the correction value table BT2 shown in FIGS. 32 and 33 are generated.

When the processes of setting the correction values are completed, the correction data determination unit B416 makes the brightness non-uniformity detection unit B411 display a corrected image corrected by the element region storage table BT1 and the correction value table BT2 so as to calculate the brightness non-uniformity distribution of the corrected image (process BS20).

The correction data determination unit B416 makes the brightness non-uniformity extreme value setting unit B412 set the extreme values on the basis of the brightness non-uniformity distribution after the brightness non-uniformity has been corrected, and determines whether or not the set extreme values are within the range of a threshold value (process BS21).

If it is determined that the set extreme values are not within the range of the threshold value, the correction data determination unit B416 adds the extreme values obtained at this time in addition to the previously set extreme values so as to divide each element region again and set the node values and element values for each of the polygon element regions which have been newly generated by the division process, and repeats the process until the corrected image is within the range of the threshold value.

On the other hand, if it is determined that the set extreme values are within the range of the threshold value, the correction data determination unit B416 records the element region storage table BT1 and the correction value table BT2 in the correction data storage unit B101 of the projector B100 which is an object to be corrected (process BS22).

When the correction data determination unit B416 completes recording the element region storage table BT1 and the correction value table BT2 in the correction data storage unit B101, the correction data determination unit B416 determines whether or not the correction values of images having different gray-scale levels are to be generated (process BS23). When the correction values of images having different gray-scale levels are generated, the correction data determination unit B416 changes the gray-scale level of projection image data for detection (process BS24), and starts to generate a correction value on the basis of an image having a new gray-scale level and repeats generating the correction values as many as the number of needed gray-scale images.

3. Configuration of Projector B100

Figure 40:
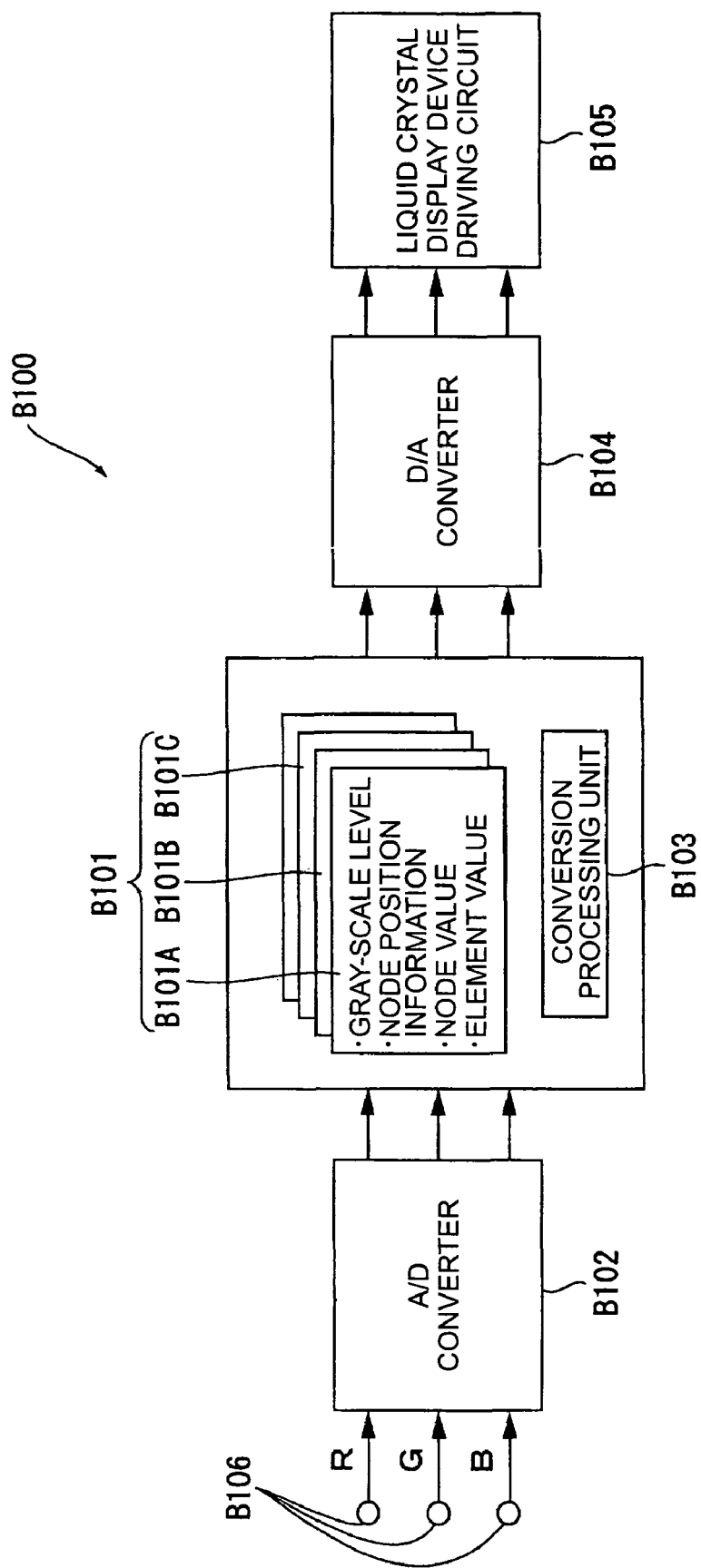
FIG. 40 is a view schematically illustrating an image processing circuit of a projector having a correction data storage unit in which a correction value generated by the correction data generating device in the embodiment is stored.

An image processing circuit of the projector B100, for which the correction data is generated by the correction data generating device B1, includes an A/D converter B102, a conversion processing unit B103, a D/A converter B104, and a liquid crystal display device driving circuit B105, as shown in FIG. 40. Image signals inputted from RGB terminals B106 are processed by the image processing circuit so as to form optical images on a liquid crystal display device.

The A/D converter B102 converts image signals inputted as analog signals into digital signals, and the digitalized image signals are output to the conversion processing unit B103.

The conversion processing unit B103 serving as a correction processing unit includes a correction data storage unit B101 storing correction data generated by the correction data generating device B1. The conversion processing unit B103 converts inputted image signals on the basis of the correction data storage unit B101 and corrects the image signals so as to have a brightness value corresponding to each of the image signals.

In the correction data storage unit B01, a plurality of correction data tables B101A, B101B, B101C, . . . which store node position information, node values, and element values corresponding to different gray-scale levels are stored. The conversion processing unit B103 selects one of the correction data tables B101A, B101B, B101C, . . . corresponding to the gray-scale level of an inputted image signal so as to correct the image signal. In addition, the gray-scale level of an inputted image signal is determined in a frame unit, and the determination may be made on the basis of the average brightness value of the entire screen or the brightness value in a region having the largest area.

Further, image signals corrected by the conversion processing unit B103 are output to the next-stage D/A converter B104.

The D/A converter B104 converts the image signals corrected by the conversion processing unit B103 into analog signals and then outputs the analog image signals to the liquid crystal display device driving circuit B105.

The liquid crystal display device driving circuit B105 drives a liquid crystal display device on the basis of the corrected image signals inputted through the D/A converter B104 such that projection images without brightness non-uniformity are projected onto a screen.

According to the projector B100 having the correction data storage unit B101, since the brightness non-uniformity correction value is set according to the brightness non-uniformity of an image displayed on a screen by storing the correction data tables B101A, B101B, B101C, . . . for each gray-scale level with the extreme values of the brightness non-uniformity as nodes, the brightness non-uniformity can be corrected in high precision. As a result, it is possible to provide a projector capable of displaying a high-quality image with a minimum amount of data.

Modifications

The invention is not limited to the above-described embodiments, but various modifications and changes can be made within the scope and spirit of the invention.

Even though the invention has been applied with respect to the correction data tables 101A, 101B, 101C, . . . which correct the brightness non-uniformity of an image displayed on a screen in the first embodiment, the invention is not limited thereto. That is, even when the color non-uniformity is corrected, correction data may be generated by applying the invention thereto and the correction data may be stored in a correction data storage unit of a projector, or it is possible to provide a projector capable of simultaneously correcting the brightness non-uniformity and the color non-uniformity by storing both the brightness non-uniformity correction data and the color non-uniformity correction data in the projector.

Further, even though the correction data tables 101A, 101B, 101C, . . . have been generated in order to correct a projection image of the projector 100 in the first embodiment, the invention is not limited thereto. That is, the invention may be applied to a thin liquid crystal display device and a self-luminous image display device, such as a PDP device or an organic EL display device.

Furthermore, even though the invention has been applied with respect to the correction data tables B101A, B101B, B101C, . . . which correct the brightness non-uniformity of an image displayed on a screen in the second embodiment, the invention is not limited thereto. That is, even when the color non-uniformity is corrected, correction data may be generated by applying the invention thereto and the correction data may be stored in a correction data storage unit of a projector, or it is possible to provide a projector capable of simultaneously correcting the brightness non-uniformity and the color non-uniformity by storing both the brightness non-uniformity correction data and the color non-uniformity correction data in the projector.

In addition, even though the correction data tables B101A, B101B, B101C, . . . have been generated in order to correct a projection image of the projector B100 in the second embodiment, the invention is not limited thereto. That is, the invention may be applied to a thin liquid crystal display device and a self-luminous image display device, such as a PDP device or an organic EL display device.

Besides, the specific structure, the specific shape, and the like when the invention is applied may be replaced with another structure or the like within a range in which an object of the invention can be achieved.

In addition to a projector, the invention can be preferably applied to an image display device, such as a PDP device or an organic EL display device.

What is claimed is:

1. A method of generating a correction value of an image generating device by a correction unit, the image generating device displaying an image which has a non-uniformity, the correction unit correcting an inputted image signal of the image by using a correction value corresponding to the non-uniformity, and then the correction unit outputting the corrected image signal to the image generating device, the method comprising:

detecting the non-uniformity of the image displayed on the screen;

setting nodes on the basis of the detected non-uniformity;

dividing the image into a plurality of element regions by connecting the set nodes to one another; and setting a correction value for each of the divided plurality of element regions, each node being a single XY coordinate, the setting of the nodes including:

setting a distance between equipotential lines on the basis of the non-uniformity, each of the equipotential lines being obtained by joining pixels having approximately same output characteristic values to one another;

setting a plurality of equipotential lines on the basis of the set distance between equipotential lines;

setting a plurality of nodes on each of the set equipotential lines; and dividing the image displayed on the screen into a plurality of element regions on the basis of the set nodes, each equipotential line having substantially the same output characteristic values, wherein the setting of the distance between equipotential lines includes:

acquiring a portion, in which an output characteristic value farthest from an output characteristic value to be originally displayed is detected, on the basis of the non-uniformity, and setting the distance between equipotential lines in the vicinity of the acquired detection portion to be narrower than those in other portions.

2. The method of generating the correction value of the image display device according to claim 1, wherein the setting of the distance between equipotential lines includes:

generating a histogram corresponding to an output characteristic value on the basis of the non-uniformity; and setting the distance between equipotential lines in the vicinity of a peak value of the generated histogram to be narrow.

3. The method of generating the correction value of the image display device according to claim 1, wherein the output characteristic value is a brightness output value or a color output value of the image generating device.

4. The method of generating the correction value of the image display device according to claim 1, wherein the output characteristic value includes brightness.

5. A non-transitory computer readable storage medium having a computer-executable program embedded thereon, the program including computer executable instructions for generating a correction value of an image display device having an image display unit and a correction unit, the image display unit having a screen on which an image is displayed and an image generating device which is paired with the screen and of which an output characteristic value has non-uniformity and the correction unit correcting an inputted image signal by using a correction value corresponding to the non-uniformity and then outputting the corrected image signal to the image display unit, the program, when executed by a computer, causing the computer to: execute the method of generating the correction value according to claim 1.

6. An image display device comprising:

an image display unit having a screen on which an image is displayed and an image generating device which is paired with the screen and of which an output characteristic value has non-uniformity; and a correction unit correcting an inputted image signal by using a correction value corresponding to the non-uniformity and then outputting the corrected image signal to the image display unit, wherein the correction unit includes:

a detecting unit that detects the non-uniformity of the image displayed on the screen;

a setting unit that sets nodes on the basis of the detected non-uniformity;

a dividing unit that divides the image into a plurality of element regions by connecting the set nodes to one another; and a correction value setting unit that sets a correction value for each of the divided plurality of element regions, the setting unit includes:

a distance setting unit that sets a distance between equipotential lines on the basis of the non-uniformity, each of the equipotential lines being obtained by joining pixels having approximately same output characteristic values to one another;

a equipotential line setting unit that sets a plurality of equipotential lines on the basis of the set distance between equipotential lines; and a node setting unit that sets a plurality of nodes on each of the set equipotential lines, wherein the dividing unit divides the image displayed on the screen into the plurality of element regions on the basis of the set nodes, each equipotential line having substantially the same output characteristic values, the distance setting unit includes:

an acquiring a portion, that detects an output characteristic value farthest from an output characteristic value to be originally displayed, on the basis of the non-uniformity, wherein the distance between equipotential lines in the vicinity of the acquired detection portion is set to be narrower than those in other portions.

7. The image display device according to claim 6, wherein each of the element regions is a polygon element region formed by connecting the nodes on the equipotential lines in a straight-line manner so as not to overlap each other, and the image display device further comprising:

an correction value storage unit, the correction value storage unit includes:

an element region storage table that stores node position information indicating the position of each of the element regions within the screen and a correction parameter in an element region specified by the node position information; and a correction value table that stores a correction value corresponding to the correction parameter.

8. The image display device according to claim 7, wherein the correction value storage unit stores a plurality of correction values corresponding to images having different gray-scale levels.

9. The image display device according to claim 6, wherein the output characteristic value is a brightness output value or a color output value of the image generating device.

10. The image display device according to claim 6, wherein the output characteristic value includes brightness.

* * * * *